US007983158B2

(12) United States Patent
Guo et al.

(10) Patent No.: US 7,983,158 B2
(45) Date of Patent: Jul. 19, 2011

(54) ROUTING TOPOLOGY BANDWIDTH MANAGEMENT METHODS AND SYSTEM

(75) Inventors: Liang Guo, Brighton, MA (US); Whay C. Lee, Cambridge, MA (US); Anthony R. Metke, Naperville, IL (US); Deepak Bansal, Redmond, WA (US)

(73) Assignee: Motorola Solutions, Inc., Schaumburg, IL (US)

( * ) Notice: Subject to any disclaimer, the term of this patent is extended or adjusted under 35 U.S.C. 154(b) by 841 days.

(21) Appl. No.: 11/291,433

(22) Filed: Nov. 30, 2005

(65) Prior Publication Data

US 2007/0121503 A1   May 31, 2007

(51) Int. Cl.
| | |
|---|---|
| G01R 31/08 | (2006.01) |
| G06F 11/00 | (2006.01) |
| G08C 15/00 | (2006.01) |
| H04J 1/16 | (2006.01) |
| H04J 3/14 | (2006.01) |
| H04L 1/00 | (2006.01) |
| H04L 12/26 | (2006.01) |
| H04L 12/28 | (2006.01) |
| H04L 12/56 | (2006.01) |

(52) U.S. Cl. ................................. 370/230; 370/395.2
(58) Field of Classification Search ............... 370/229, 370/230, 231, 235, 236, 238, 395.2, 395.32, 370/395.41, 395.5, 398, 400, 404
See application file for complete search history.

(56) References Cited

U.S. PATENT DOCUMENTS

| | | | | |
|---|---|---|---|---|
| 6,262,984 | B1 * | 7/2001 | Rochberger | 370/395.2 |
| 6,363,319 | B1 * | 3/2002 | Hsu | 701/202 |
| 6,487,170 | B1 * | 11/2002 | Chen et al. | 370/231 |
| 6,529,499 | B1 * | 3/2003 | Doshi et al. | 370/352 |
| 6,590,867 | B1 * | 7/2003 | Ash et al. | 370/236 |
| 6,738,819 | B1 | 5/2004 | Li et al. | |
| 6,823,395 | B1 * | 11/2004 | Adolfsson | 709/242 |
| 7,006,506 | B1 * | 2/2006 | Naik | 370/397 |
| 7,031,262 | B2 * | 4/2006 | Vasseur et al. | 370/248 |
| 7,054,938 | B2 * | 5/2006 | Sundqvist et al. | 709/227 |
| 7,215,644 | B2 * | 5/2007 | Wu et al. | 370/248 |
| 7,330,435 | B2 * | 2/2008 | Guerin et al. | 370/238 |
| 7,447,203 | B2 * | 11/2008 | Chen et al. | 370/389 |

(Continued)

OTHER PUBLICATIONS

Schelen, O., Pink, S., "Resource Reservation Agents in the Internet", Lulea University of Technology, SE-971 87 Lulea, Sweden, (olov, steve)@cdt.luth.se. Year: 1998.

Schelen, O., Pink, S., "Resource Sharing in Advance Reservation Agents", Computer Science and Electrical Engineering, Lulea University of Technology, SE-971 87 Lulea, Sweden, Journal of High Speed Networks (1998) IOS Press.

(Continued)

*Primary Examiner* — Seema Rao
*Assistant Examiner* — Xavier Szewai Wong
(74) *Attorney, Agent, or Firm* — Valerie M. Davis; Anthony P. Curtis

(57) ABSTRACT

A system for facilitating bandwidth management in a routing domain is presented. In the system, area bandwidth managers are coupled to a domain bandwidth manager and arranged in accordance with an Open Shortest Path First (OSPF) hierarchical routing topology with the domain bandwidth manager at an upper level of the topology. Each area bandwidth manager is located in a different area of the routing topology in at least one lower level of the topology. The domain bandwidth manager and the area bandwidth managers cooperatively coordinate admission control to a routing domain for facilitating a communication session between a source device and a destination device.

20 Claims, 13 Drawing Sheets

U.S. PATENT DOCUMENTS

| | | | |
|---|---|---|---|
| 2002/0024934 A1* | 2/2002 | Galand et al. | 370/238 |
| 2002/0051449 A1* | 5/2002 | Iwata | 370/389 |
| 2003/0063560 A1* | 4/2003 | Jenq et al. | 370/216 |
| 2003/0072270 A1* | 4/2003 | Guerin et al. | 370/254 |
| 2003/0078610 A1* | 4/2003 | Yedlowski | 606/179 |
| 2003/0099203 A1* | 5/2003 | Rajan et al. | 370/238 |
| 2003/0103510 A1* | 6/2003 | Svanberg et al. | 370/395.2 |
| 2004/0042402 A1* | 3/2004 | Galand et al. | 370/237 |
| 2004/0081092 A1 | 4/2004 | Rhee et al. | |
| 2004/0120290 A1* | 6/2004 | Makhijani et al. | 370/335 |
| 2004/0215817 A1* | 10/2004 | Qing et al. | 709/238 |
| 2005/0050246 A1* | 3/2005 | Lakkakorpi et al. | 710/36 |
| 2005/0169183 A1* | 8/2005 | Lakkakorpi et al. | 370/238 |
| 2006/0002297 A1* | 1/2006 | Sand et al. | 370/235 |
| 2006/0120384 A1* | 6/2006 | Boutboul et al. | 370/400 |
| 2006/0291447 A1* | 12/2006 | Siliquini et al. | 370/352 |
| 2007/0058568 A1* | 3/2007 | Previdi et al. | 370/254 |
| 2007/0091793 A1* | 4/2007 | Filsfils et al. | 370/228 |

OTHER PUBLICATIONS

Braden, R., Zhang, L., Berson., S., Herzog, S., "Resource Reservation Protocol (RSVP)—Version 1 Functional Specification", Network Working Group, University of Michigan, Sep. 1997.

Nichols, K., Jacobson, V., Zhang, L., "A Two-bit Differentiated Services Architecture for the Internet", UCLA, Copyright © The Internet Society (1999).

Moy, J., "OSPF Version 2", Network Working Group, Ascend Communications, Inc., pp. 1-158, Apr. 1998.

* cited by examiner

ROUTING TOPOLOGY BANDWIDTH MANAGEMENT METHODS AND SYSTEM

CROSS-REFERENCE TO RELATED APPLICATIONS

The present application is related to the following U.S. application commonly owned together with this application by Motorola, Inc.:

Ser. No. 10/930,309, filed Aug. 30, 2004, titled "Method and Apparatus for Bandwidth Management" by Metke.

FIELD OF THE INVENTION

The present invention relates generally to bandwidth management in a routing domain and more specifically to methods and apparatus for cooperative admission control to a routing domain and associated bandwidth management among a plurality of bandwidth managers arranged in accordance with a hierarchical routing topology that characterizes the routing domain.

BACKGROUND OF THE INVENTION

Bandwidth is a key resource for exchanging information in a communication network. To provision quality of service (QoS) in a network, bandwidth resources in the network must be managed appropriately to avoid over-subscription leading to congestion. In a network defined by a routing domain, bandwidth on each link is dynamically allocated among data flows traversing the routing domain from an ingress edge router to an egress edge router.

Bandwidth management (BM) comprises allocation, release, and tracking of network bandwidth such that it can be efficiently utilized. Routing topology BM (RTBM) refers to BM that utilizes complete or summarized information on relevant network topology. An RTBM system comprises two key functional components: a topology manager (TM), which tracks topology information and generates paths in a manner that is consistent with those used by routers for packet forwarding, and an admission controller (AC), which determines if a session may be admitted into a routing domain and manages corresponding allocation and subsequent release of bandwidth according to paths generated by the topology manager.

Link bandwidth may be reserved for a data flow in a distributed manner, wherein each router along a path of a reservation request makes a local admission control decision to determine if the request may be accepted. If all the routers along the path accept the request, then the data flow is admitted and an appropriate amount of bandwidth is reserved along the path. Alternatively, in a centralized approach, bandwidth reservation requests are forwarded to a central server, which determines if the requests may be accepted, allocates bandwidth accordingly, and keeps track of all bandwidth allocations that it has made.

A routing domain is often structured hierarchically for scalability. Bandwidth management in such a routing domain must be designed to be scalable as well as efficient. However, the known bandwidth reservation approaches, including the two above-mentioned approaches, have shortcomings that limit scalability and/or efficiency of associated bandwidth management. For example, the known distributed approaches may be prohibitively costly and/or slow for very large systems since it requires all or a portion of the routers in the routing domain to manage per-flow state and to execute local admission control to determine if a reservation request can be accepted. Moreover, using the known centralized approach is not scalable for very large systems due, for instance, to storage requirements for a single centralized server to maintain required topology tables and databases for implementing necessary protocols associated with bandwidth management.

Thus, there exists a need for methods that can enable a plurality of bandwidth managers to cooperate among themselves in executing session admission control and managing topology in a hierarchical routing domain.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF ILLUSTRATED EMBODIMENTS

Figure 1:
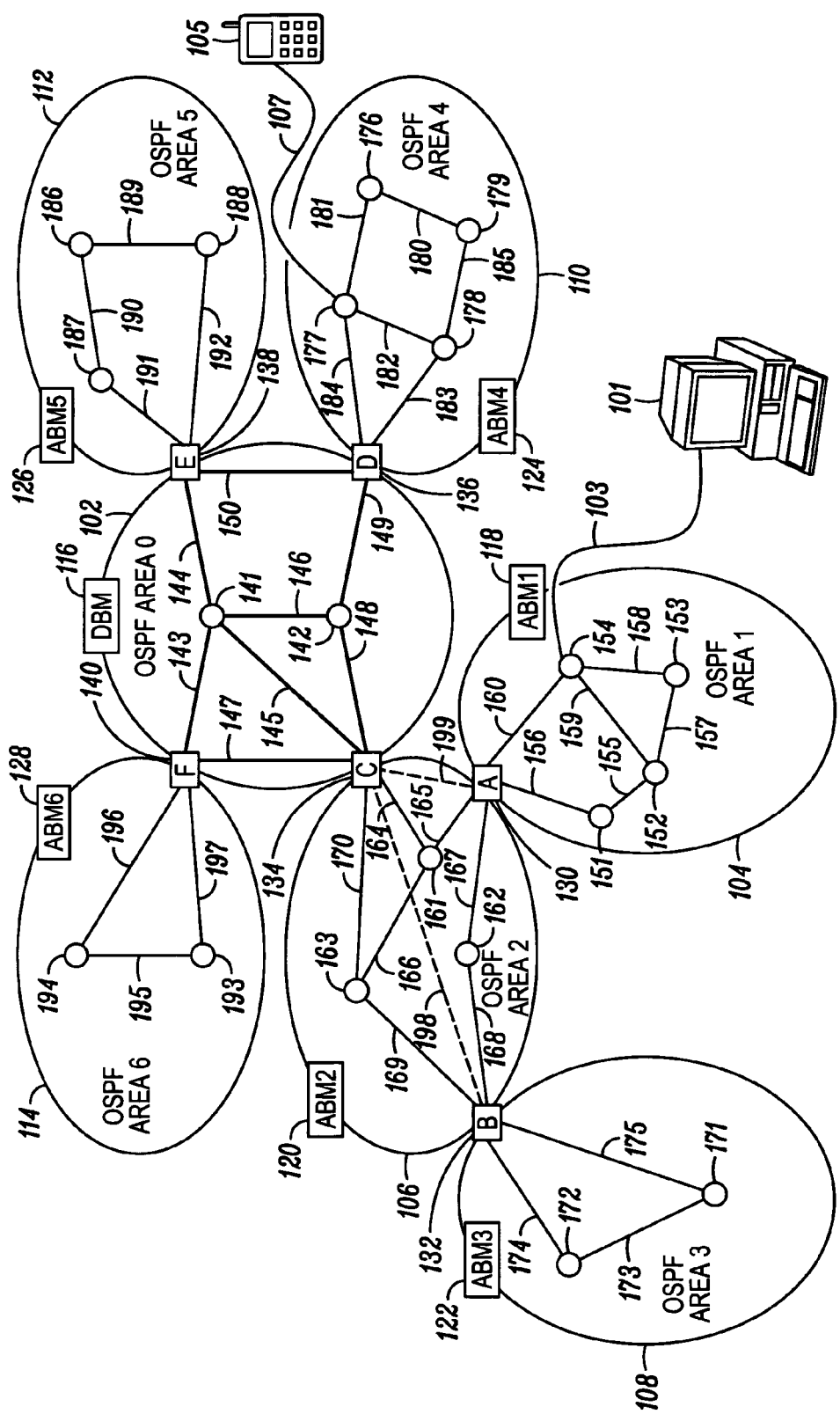
FIG. 1 illustrates a hierarchical routing domain and a system in accordance with an embodiment of the present invention for managing admission to the routing domain for communication sessions.

Before describing in detail embodiments that are in accordance with the present invention, it should be observed that the embodiments reside primarily in combinations of method steps and apparatus components related to a method and apparatus for hierarchical routing topology bandwidth management. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

It will be appreciated that embodiments of the invention described herein may be comprised of one or more conventional processors and unique stored program instructions that control the one or more processors to implement, in conjunction with certain non-processor circuits, some, most, or all of the functions of the method and apparatus for hierarchical routing topology bandwidth management described herein. As such, these functions may be interpreted as steps of a method to perform the hierarchical routing topology bandwidth management described herein. Alternatively, some or all functions could be implemented by a state machine that has no stored program instructions, or in one or more Application Specific Integrated Circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

Generally speaking, pursuant to the various embodiments, an architecture of a system and related methods are described for managing network resources in a hierarchical routing domain, e.g., an Open Shortest Path First (OSPF) routing domain, wherein resources in terms of bandwidth are dynamically allocated among data flows. In one embodiment, a system for facilitating bandwidth management in a routing domain is described. The system includes a domain bandwidth manager (DBM) and a plurality of area bandwidth managers (ABMs) coupled to the domain bandwidth manager and arranged in accordance with an OSPF hierarchical routing topology with the domain bandwidth manager at an upper level of the topology, e.g., a backbone OSPF area, and each area bandwidth manager located in and managing a different area of the routing topology in at least one lower level of the topology.

The system comprises two functional components: a topology manager, which tracks topology information and generates paths in a manner that is consistent with those used by routers for packet forwarding, and an admission controller, which determines if a session may be admitted into the routing domain and manages corresponding allocation of bandwidth on network links along a selected path. The domain bandwidth manager and the plurality of area bandwidth managers cooperatively coordinate admission control to a routing domain for facilitating a communication session between a source device and a destination device. In one embodiment, the admission control function is centralized at the domain bandwidth manager, and in another embodiment the admission control function is shared in a distributed manner between the domain and area bandwidth managers. The topology management function is shared in a distributed manner among the domain and area bandwidth managers, such that each bandwidth manager is responsible for collecting topology information within a corresponding area in the routing domain.

Failure recovery mechanisms are also described herein for addressing instances where domain topology changes during or after session set-up.

Referring now to the drawings, and in particular FIG. 1, an Internet Protocol (IP) enabled wired network is shown and indicated generally at 100. Network 100 functions to facilitate calls (or real-time communication sessions) between IP enabled client devices (such as laptops and Personal Digital Assistants (PDAs), for instance) in the network. In this embodiment, network 100 comprises a single routing domain that may be connected to at least one other network domain in an overall network such as the Internet, wherein a routing domain is a collection of routers that coordinate their routing knowledge to execute path selection using a single routing protocol.

Users of IP enabled devices may communicate using bandwidth resources of network 100. Only two such devices, e.g., a laptop 101 and a PDA 105, are shown for illustrative purposes. However, it should be readily understood by those skilled in the art that hundreds or perhaps even thousands of such devices may share limited bandwidth resources of network 100. Therefore, it is desirable that network 100 be scalable for handling large numbers of users and that network 100 be provisioned for fairly and efficiently allocating its resources through, for instance, appropriately managing session admission control and bandwidth reservations to meet Quality of Service (QoS) requirements and administrative criteria for various users volumes and applications in the network.

For scalability, network 100 comprises a hierarchical routing structure comprising a plurality (i.e., two or more) of levels, wherein each level of the hierarchy comprises a plurality of areas defined for that level, and each area comprises a plurality of routers interconnected by physical and virtual links for facilitating end-to-end communications within network 100. The physical links within network 100 may comprises cables and lines, etc., as is well known in the art, and the bandwidth capability of these physical links characterize the available bandwidth resources within network 100. The embodiments described herein are implementation within a two-level hierarchical routing domain. However, those of ordinary skill in the art will realize that the teachings herein can be extended to three or more levels without loss of generality. For implementations of greater than two hierarchical levels, the routing structure comprises physical routers and links at the lowest level. However, at least a portion of the routers and links at the upper levels are implemented as virtual routers and links, wherein a virtual router, at a given level, is an abstract representation of a cluster of physical and/or virtual routers at a lower level.

A link state routing protocol is used by the routers in network 100 for obtaining the identities and link state of active links in at least a portion of network 100 as well as the administrative cost associated with each known link. It is further desirable that the link state protocol be provisioned for enabling each router to "see" or have knowledge of the topology of at least a portion of network 100. The maximum transmission bandwidth and the ratio of bandwidth allocated to existing media (e.g., data, audio, video, etc.) flows or traffic on a link are respectively considered the capacity and utilization of a link. The capacity and utilization of a link are collectively referred to, non-exclusively, as the link state of a link. Topology information associated with a network or an area of the network is the collection of such link states of all active links in the network or area, the interfaces on the ends of the links, and, among possibly other characteristics, an administrative cost to send user traffic over the links.

One such link state protocol that may be used (and which is implemented in the embodiments described herein) is Open Shortest Path First (OSPF) protocol as described in Internet Engineering Task Force (IETF) Request for Comment (RFC) 2328. The OSPF protocol is a link state routing protocol, wherein link state databases are established by routers in a network based on link state advertisements that are flooded throughout the network. A link state database describes all reachable routers and links that interconnect them in the network. It provides a complete description of the network, as well as the administrative cost of transmitting packets on each link. Based on the link state information, each router determines a shortest forwarding path to each known destination, and maintains a routing table that is comprised of a next-hop interface for each reachable destination and the corresponding distance to the destination. The OSPF protocol uses Dijkstra's shortest path algorithm to select paths with the smallest administrative cost for forwarding packets.

For scalability, the OSPF protocol allows for the division of a routing domain into a plurality of OSPF areas comprising associated routers with their interfaces, hosts and links connecting the routers and hosts, wherein each area runs a separate copy of the basic OSPF link-state routing algorithm for generating a different link-state database corresponding to each area and wherein the detailed topology of an area is invisible from the outside of the area. Moreover, each area is attached, via physical or virtual links, to an OSPF backbone area, such that the resulting inter-area routing topology is a hub-and-spoke topology. In an exemplary two-level hierarchical OSPF domain, routing within an OSPF area at a lower level is based on link state advertisements (LSAs) as defined in the OSPF protocol, whereas routing at an upper level is based on summary link state advertisements as defined in the OSPF protocol.

We now turn to the specific domain structure and network elements illustrated in network 100. Network 100 comprises a two-level hierarchical OSPF domain. The first (or upper) level comprises an OSPF backbone area 102, referred to in FIG. 1 as OSPF Area 0. The second (or lower) level comprises areas 104, 106, 108, 110, 112, and 114, referred to respectively in FIG. 1 as OSPF Area 1, OSPF Area 2, OSPF Area 3, OSPF Area 4, OSPF Area 5 and OSPF Area 6.

Area 0 comprises internal routers 141 and 142 (each having all of its interfaces connected to other routers in Area 0) and also further comprises area border routers (ABRs), which are routers attached to two or more areas. In this embodiment, OSPF Area 0 comprises: ABR A (130) attached to areas 104, 106 and 102 (via a virtual link 199); ABR B (132) attached to areas 106, 108 and 102 (via a virtual link 198); ABR C (134) attached to areas 102 and 106; ABR D (136) attached to areas 102 and 110; ABR E (138) attached to areas 102 and 112; and ABR F (140) attached to areas 102 and 114. OSPF Area 0 also comprises links 143-150, 198 and 199 connecting the area's internal and area border routers as illustrated in FIG. 1.

Each of the internal backbone routers is a commercially available product with IP interfaces (all of which are connected to the backbone area) and an IP address at each interface. Internal routers in the backbone area adhere to the OSPF protocol and run OSPF software that allows the routers to exchange link state advertisements with other routers in the backbone area to establish in each internal backbone router an identical link state database that corresponds to Area 0, to enable intra-area routing within Area 0. As used herein, in intra-area routing packets are routed solely on information obtained within a given area. Each ABR is also a commercially available product with IP interfaces and an IP address at each interface and that adhere to the OSPF protocol and run OSPF software. Since the ABRs are also backbone routers, they (like the internal backbone routers) exchange link state advertisements with other routers in the backbone area to establish in each ABR an identical link state database that corresponds to Area 0.

Moreover, as can be seen from FIG. 1, all area border routers are connected to the backbone area, either directly or via virtual links (indicated as by dashed lines in FIG. 1). This enables additional functionality in the ABRs using the OSPF protocol. More specifically, each ABR condenses the routing topology information of their attached non-backbone area(s) into summary information for distribution via the backbone. The backbone enables the exchange of this summary information between ABRs using distance vector mechanisms and summary link state advertisements. Each ABR hears the summary link state advertisements from all other ABRs and, thereby, has not only complete topological information concerning the backbone area but further has the area summaries from each of the other ABRs. With this information, an ABR forms a picture of the distance to all areas outside of its area by examining the collected summary link state advertisements and adding in the backbone distance to each advertising router. In other words, this information enables the area border router to calculate shortest paths to all inter-area destinations and can further be used in the embodiments described herein for determining an inter-area or area-by-area path that (in the OSPF protocol embodiment) comprises one or more ABRs. The ABR then advertises these paths into its attached areas, which enables the area's internal routers to pick the best exit router when forwarding traffic to an inter-area destination.

Accordingly, when routing a packet between two non-backbone areas that are directly attached to the backbone area, an inter-area path that the packet will travel comprises at least three contiguous segments: a first intra-area path from the source to an area border router, a backbone path between the source and destination areas, and a second intra-area path to the destination. When routing a packet over non-backbone areas that are connected to the backbone area via virtual links, the inter-area path that the packet will travel includes at least one segment that is an intra-area path from an area border router in a non-backbone area to another area border router in the same non-backbone area. The inter-area path is defined herein as a path comprising at least two areas and at least one inter-area "link" (the inter-area "link" in the OSPF protocol can be deemed an ABR) connecting the areas.

Turning now to the specifics of the areas comprising the second level of the two-level hierarchical OSPF domain that comprises network 100, OSPF Area 1 comprises internal routers 151, 152, 153 and 154, laptop 101, and links 103 and 155-160 connecting the area's internal routers to each other and to ABR 130 and laptop 101 as depicted in FIG. 1. OSPF Area 2 comprises internal routers 161, 162 and 163 and links 164-170 connecting the area's internal routers to each other and to ABRs 130, 132 and 134 as depicted in FIG. 1. OSPF Area 3 comprises internal routers 171 and 172 and links 173-175 connecting the area's internal routers to each other and to ABR 132 as depicted in FIG. 1. OSPF Area 4 comprises internal routers 176, 177, 178 and 179, PDA 105 and links 107 and 180-185 connecting the area's internal routers to each other and to ABR 136 and PDA 105 as depicted in FIG. 1. OSPF Area 5 comprises internal routers 186, 187 and 188 and links 189-192 connecting the area's internal routers to each other and to ABR 138 as depicted in FIG. 1. OSPF Area 6 comprises internal routers 193 and 194 and links 195-197 connecting the area's internal routers to each other and to ABR 140 as depicted in FIG. 1.

Each router in the lower level is likewise a commercially available product with IP interfaces (all of which are connected to other routers in its respective area) and an IP address at each interface. Moreover, the routers adhere to the OSPF protocol and run OSPF software that allows the routers to share network topology information with other routers in their area and to, thereby, establish a link state database corresponding to its respective area. This link state database can be used in the embodiments described herein for determining an intra-area path that comprises one or more internal area routers and the links connecting those routers over which IP packets can be routed.

Those skilled in the art, however, will recognize and appreciate that the specifics of this illustrative example are not specifics of the invention itself and that the teachings set forth herein are applicable in a variety of alternative settings. For example, since the teachings described do not depend on the link state protocol used, they can be applied to any type of link state protocol although OSPF protocol is shown in this embodiment. As such, other alternative implementations of using different types of link state protocols such as, for instance, intermediate system to intermediate system (ISIS) protocol, are contemplated and are within the scope of the various teachings described. Moreover, those of ordinary skill in the art will realize that network 100 may comprises fewer or likely more areas, routers, links and hierarchical levels without departing from the scope of the teachings herein. For example, in an alternative embodiment one or more areas in the domain may also have a hierarchical topology and the area bandwidth manager associated with such areas may effectively function as an upper level bandwidth manager for its area as mentioned above.

Network 100 further comprises a routing topology bandwidth management (RTBM) system that uses a complete, summarized and/or a combination thereof of routing topology information for facilitating bandwidth management within the network. The RTBM system comprises a domain bandwidth manager (DBM) 116 and a plurality of area bandwidth managers (ABMs) (e.g., ABM1 (118), ABM2 (120), ABM3 (122), ABM4 (124), ABM5 (126) and ABM6 (128)) coupled to DBM 116 and arranged in accordance with the hierarchical routing topology of network 100, wherein the DBM is associated with the upper level of network 100, and the plurality of ABMs are each located in a different area of network 100 in at least one lower-level of network 100. As shown: ABM1 is located in and associated with OSPF Area 1; ABM2 is located in and associated with OSPF Area 2; ABM3 is located in and associated with OSPF Area 3; ABM4 is located in and associated with OSPF Area 4; ABM5 is located in and associated with OSPF Area 5; and ABM6 is located in and associated with OSPF Area 6. The DBM and plurality of ABMs, in accordance with embodiments described by reference to FIGS. 2-13, cooperatively coordinate admission control to routing domain 100 for facilitating a communication session or call between a source (or transmitting) device and a destination (or receiving) device.

The RTBM system in accordance with various embodiments herein (and as illustratively shown in FIG. 1) comprises two key functional or logical components: a topology manager that tracks topology information and generates paths in a manner that is consistent with those used by routers for packet forwarding and an admission controller that determines if a session can be admitted into the routing domain and manages corresponding allocation of bandwidth on network links along a selected path. The domain bandwidth manager and the plurality of area bandwidth managers cooperatively coordinate admission control to routing domain 100 for facilitating a communication session between a source device and a destination device.

In one embodiment (as described in detail below by reference to FIGS. 4 and 5), the admission control function is centralized at the domain bandwidth manager, and in another embodiment (as described in detail below by reference to FIGS. 6-13) the admission control function is shared in a distributed manner between the domain and area bandwidth managers. The topology management function is shared in a distributed manner among the DBM and the plurality of area bandwidth managers, such that each bandwidth manager is responsible for collecting topology information within a corresponding area in the routing domain.

Figure 2:
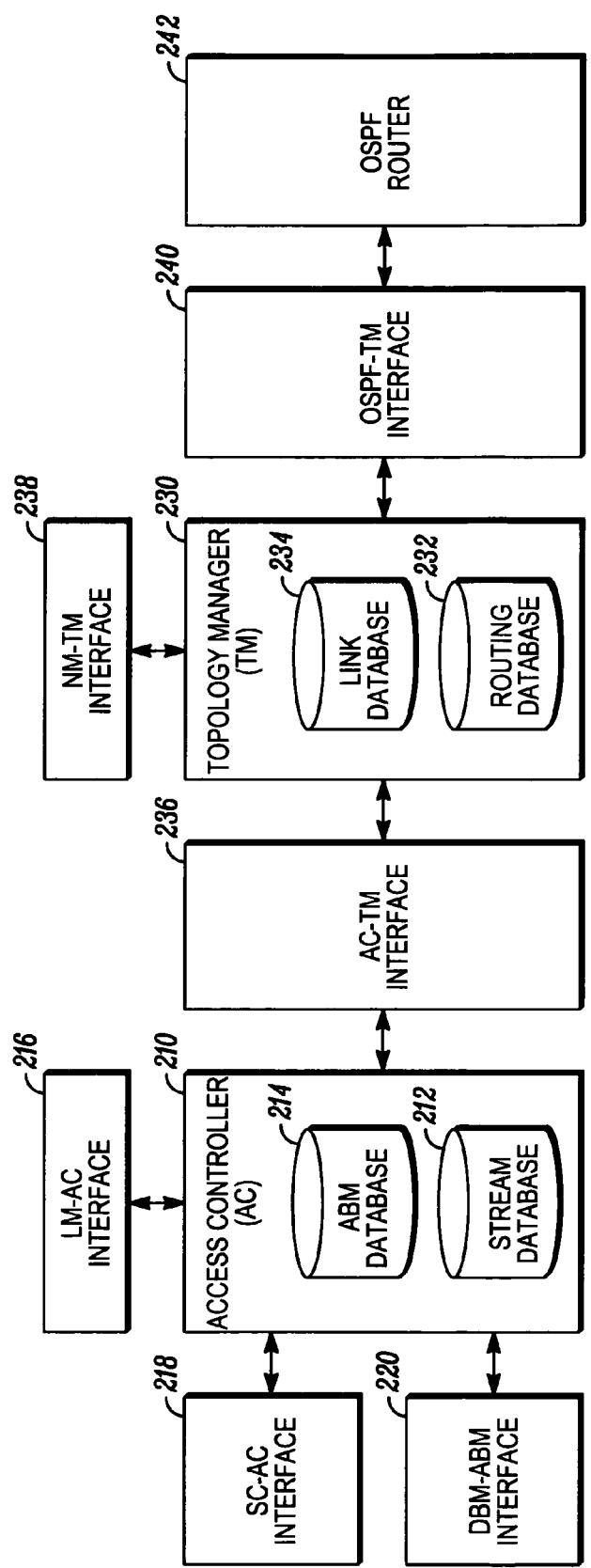
FIG. 2 illustrates bandwidth management apparatus in accordance with embodiments of the present invention.

Turning now to FIG. 2, apparatus of which a portion or all may comprise a DBM and an ABM in accordance with embodiments of the present invention is shown and generally indicated at 200. In general, the DBM 116 may comprise all of apparatus 200, whereas an ABM usually comprises only a portion of apparatus 200, wherein the portion depends on the particular RTBM system embodiment being implemented. Turning now to the DBM 116 as it embodies apparatus 200, DBM 116 comprises an access controller (AC) 210 comprising a stream database 212 and an ABM database 214 for providing access control functionality for domain 100 and further comprises a topology manager (TM) 230 comprising a routing database 232 and a link database 234. AC 210 and TM 230 are coupled via an AC-TM Interface 236. In this embodiment, DBM 116 further comprises an OSPF router 242 and an OSPF-TM Interface 240 coupling the OSPF router 242 to TM 230. Further interfaces comprising DBM 116 include an LM-AC Interface 216 (coupling the AC 210 to a location manager (LM) within network 100), a SC-AC Interface 218 (coupling the AC 210 to a Session Controller (SC) within network 100), a DBM-ABM Interface 220 (for coupling DBM 116 to each of the plurality of ABMs), and a NM-TM Interface 238 (coupling the TM 230 to a network manager (NM) within network 100).

In general, a primary function of AC 210 is to manage network resources, such as link bandwidth, and a primary function of TM 230 is to manage routing information, such as path maps, wherein a path map comprises a concatenation of link identities associated with a tandem of links. To perform its functionality, AC 210 may comprise an ABM database 214 and a stream database 212. The ABM database 214 may comprise, for example, identity information associated with (or mapped to) each ABM such as an IP address associated with the ABM and the OSPF area that the ABM manage (e.g., as identified by an IP address space), which may in one implementation be learned from announcements or advertisements from the ABMs. This information may be pre-configured in each ABM and/or there may be a suitable predetermined ABM-DBM discovery protocol utilizing, for example, a multicast group reserved for ABM-DBM discovery and registration. The stream database may, for example, be used to keep track of bandwidth allocated to all the streams associated with each active session (e.g. one session may consist of an audio stream and a video stream)

TM 230 is responsible for obtaining network topology information and generating path state information that can be provided to the AC 210 for making admission control decisions. To perform its functionality, the TM 230 may comprise a link database 234 and a routing database 232. The link database may comprise, for example, data based on LSAs and summary LSAs flooded throughout the OSPF area and used by TM 230 to calculate an intra-area signaling path and/or an inter-area path to facilitate a session communication. The routing database may, for example, be used to temporarily store calculated paths to facilitate a calculation of a shortest path as is done in this embodiment when implementing the OSPF protocol.

Link resource utilization is tracked by the AC 210. This approach provides for TM 230 to expose physical links to the AC 210, so that the AC can track reserved bandwidth on all physical links along each active path. The AC 210 receives reservation requests and makes admission control decisions based on topology specific information obtained from TM 230. In the event of a topology change, the TM 230 determines new paths for all affected paths, and provides the AC 210 with new path maps (including link capacities). The AC 210 is further responsible for determining if a session may be admitted to the network, and if so the amount of resources that will be allocated to the session. To accomplish this task, the AC 210 needs to check if there is enough available bandwidth in the network for the session, including paths traversing the routing domain from an ingress edge router to an egress edge router. The AC 210 does not have the capability itself to compute paths, and relies on the TM 230 to provide appropriate path state information whenever it is needed.

An AC-TM interface 236 is used by the TM 230 to provide the AC 210 with topology management service. Specifically, through this interface, the TM 230 receives requests from the AC 210 for stream resource reservation and update. Upon receiving a request, the TM 230 gathers desired topology information and responds to the AC 210 via the same interface. In the event of a topology change, the TM 230 sends path resource change information to the AC via this interface as well.

The AC 210 interfaces with ABMs in other OSPF areas within domain 100 (as described in detail below) via the DBM-ABM interface 220 to coordinate admission control to domain 100 for a communication session. The AC 210 interfaces with a session controller (SC) (not shown) via the SC-AC interface 218 to obtain information about each session and its associated streams and the amount of bandwidth requested for the session. The session controller may utilize Session Initiation Protocol (SIP) (for instance as described in RFC 3261), Reservation Protocol (RSVP) (for instance as described in RFC 2205) or any other signaling protocol to obtain a reservation request from a client and then, may forward a domain admission control request comprising this reservation request (or a portion thereof) to the AC 210 using any suitable mechanism. The AC 210 may further interface with a location manager (LM) (not shown) via the LM-AC interface 216 to obtain mapping between endpoints (mobile devices) and access routers associated with each session, wherein the access routers are a pair of ingress-egress edge routers used by the session to enter and exit the OSPF routing domain respectively. For example, a session between Laptop 101 and PDA 105 will be mapped to access routers 154 and 177. The AC 210 may also interface with a policy server (not shown) to make a policy-based admission control decision, such as preemption.

The TM 230 interfaces with OSPF via the OSPF-TM interface 240 to obtain topology information associated with the OSPF routing domain 100. Specifically, interface 240 is connected to an RTBM-aware OSPF router 242, which exchanges OSPF link state advertisements with other routers in the routing domain (e.g., other routers in Area 0 for the DBM) to obtain topology information used for path computation (e.g., for Area 0 and for inter-area path computations for the DBM). The TM 230 may further interface with a network manager (NM) (not shown) via the NM-TM interface 238 to obtain certain network resource information to initialize and update its link database. Such information includes, for example, the physical properties of each link in the network (for example, capacity and whether it is shared), and the correspondence between the link and the values used by routers to identify the link. These various interfaces may be implemented by means of an implementation-specific message exchange protocol, wherein the protocol provides a mechanism that supports data queries and replies.

Turning now to the implementation of the portion of apparatus 200 that may comprise an ABM, in an embodiment wherein the access control function is centralized in the DBM the ABMs comprise only TM 230, OSPF router 240 and the associated interfaces 238 and 240, which would function similarly to these functional elements comprising the DBM but would be utilized for calculating intra-area paths as opposed to both intra- and inter-area paths. Moreover, in this embodiment of the ABM, the DBM-ABM interface 220 would connect to the DBM via the TM 230 for communicating topology requests from the DBM to the ABM and for responsively communicating intra-area path communications from the TM 230 to the DBM.

In another embodiment of an ABM, wherein the access control function is performed in a distributed manner among the ABMs and the DBM (for Area 0), the ABMs comprise both the TM 230 and the AC 210 that function similar to those comprising the DBM. The ABMs in this embodiment further comprise the additional interfaces 236, 216, 218 and 220 similar to the DBM and may further comprise an ABM-ABM interface (not shown) for connecting to ABMs in other OSPF areas to facilitate access control to domain 100 in embodiments described below.

The logical elements of the DBM and ABMs and their associated functionality as described herein may be implemented any number of ways. For example, the DBM and ABMs may comprise memory (e.g., read only memory and/or random access memory) implemented using one or more discreet and conventional storage elements for implementing the databases described above and for storing executable code (software) that is implemented by one or more processors comprising the DBM and ABMs for performing all or a portion of its intended functionality in accordance with the teachings herein. Moreover, it should be further understood by those skilled in the art that the DBM and ABM may further comprise (in the alternative or in additional to) one or more ASICs or state machines for performing all of a portion of its intended functionality in accordance with the teachings herein. It should also be realized by those of ordinary skill in the art that in one embodiment the DBM and each ABM may be separate physical devices. However, in alternative embodiments, the DBM may be co-located with one of the ABMs. In addition, the DBM and one or more of the ABMs may be co-located with a router comprising its respective area.

Figure 3:
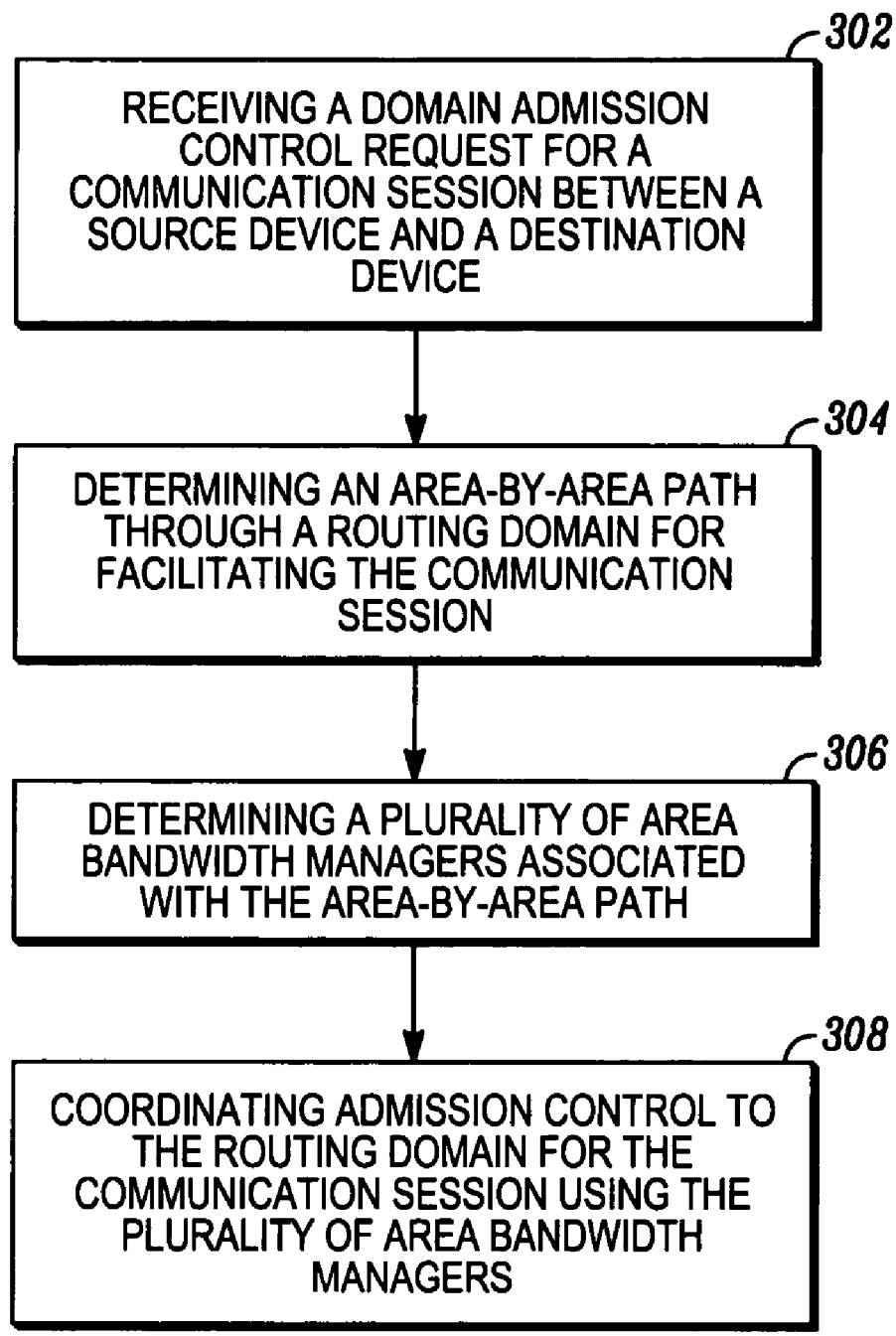
FIG. 3 illustrates a flow diagram of a method in accordance with an embodiment of the present invention.

Turning now to FIG. 3, a flow diagram illustrating a method for admission control in accordance with an embodiment of the present invention is shown and generally indicated at 300. Method 300 generally comprises the steps of: receiving (302) a domain admission control request for a communication session between a source device and a destination device; and in a domain bandwidth manager associated with an upper level in a hierarchical routing domain performing the remaining steps of determining (304) an area-by-area path through a lower level of the routing domain for facilitating the communication session, the area-by-area path comprising a plurality of areas associated with the lower level and at least one inter-area link connecting the plurality of areas; determining (306) a plurality of area bandwidth managers associated with the area-by-area path; and coordinating (308) admission control to the routing domain for the communication session using the plurality of area bandwidth managers. Detailed implementations of method 300 will next be described by reference to FIGS. 4-13.

Figure 4:
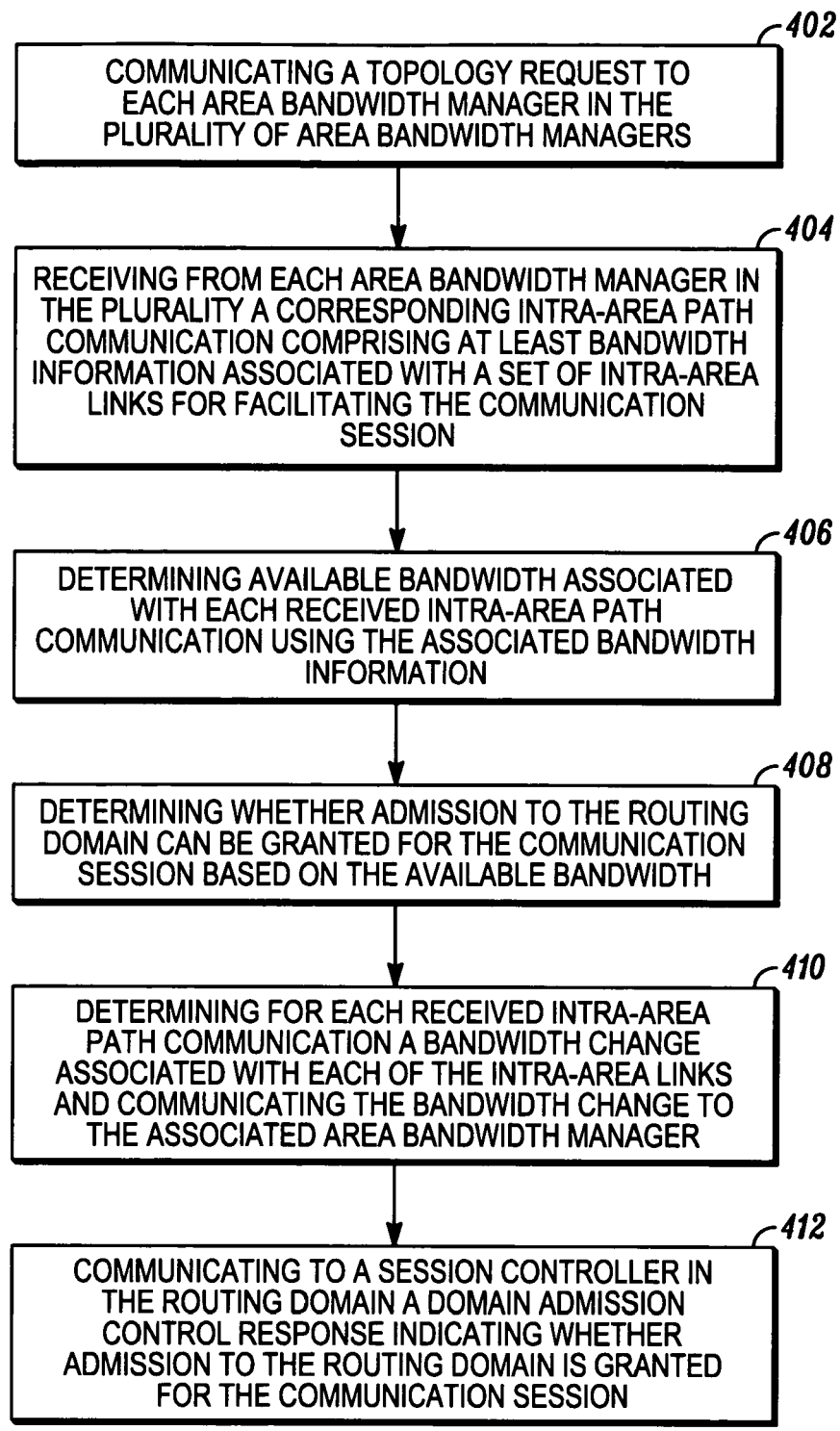
FIG. 4 illustrates a flow diagram of a method in accordance with an embodiment of the present invention.
Figure 5:
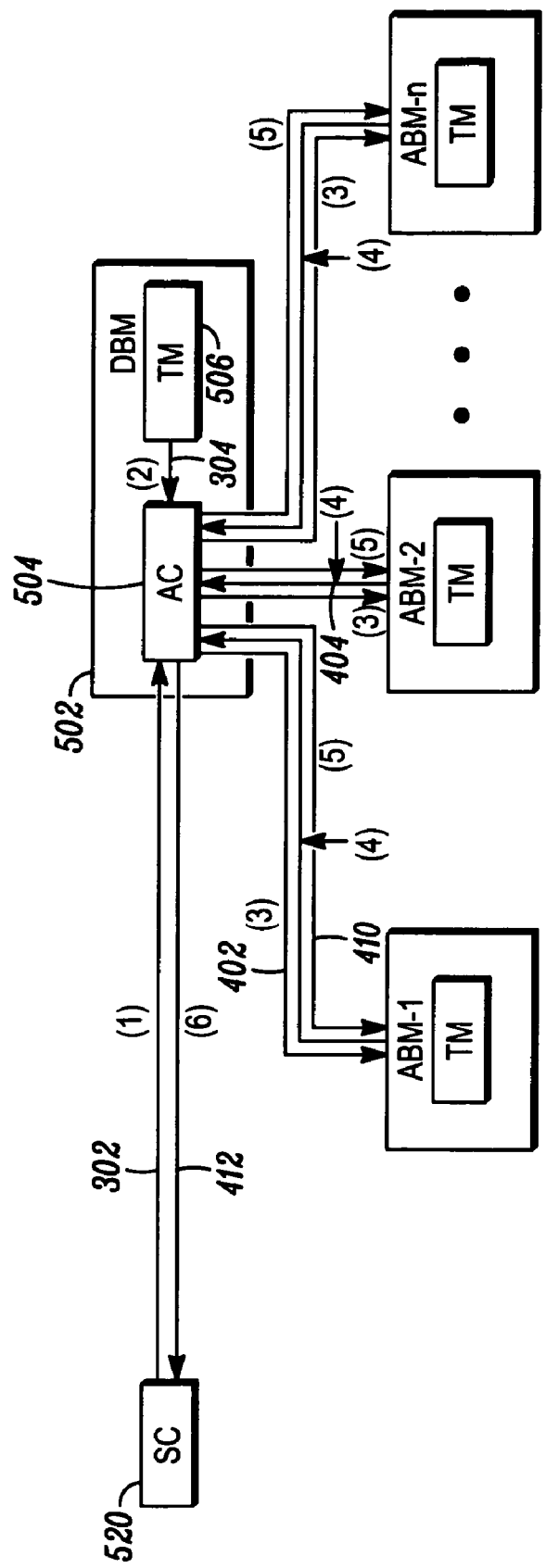
FIG. 5 illustrates centralized admission control in accordance with an embodiment of the present invention.

FIGS. 4 and 5 illustrate a method for facilitating centralized admission control in a hierarchical routing domain in accordance with an embodiment of the present invention. More specifically, FIG. 4 illustrates a flow diagram of a method 400 comprising steps for facilitating the coordination of admission control (step 308 of FIG. 3), when the DBM 116 implements centralized admission control. Method 400 comprises the steps of: communicating (402) a topology request to each area bandwidth manager in the plurality of area bandwidth managers associated with the area-by-area path; responsive to communicating the topology request, receiving (404) from each area bandwidth manager in the plurality associated with the area-by-area path a corresponding intra-area path communication comprising at least bandwidth information associated with a set of intra-area links for facilitating the communication session; determining (406) available bandwidth associated with each received intra-area path communication using the associated bandwidth information; and determining (408) whether admission to the routing domain can be granted for the communication session based on the available bandwidth.

Moreover, where the DBM 116 determines that admission can be granted to the domain for the communication session, the DBM 116 further performs the step of determining (410) for each received intra-area path communication a bandwidth change associated with each of the intra-area links corresponding to the intra-area path communication and communicating the bandwidth change to the relevant area bandwidth manager. In addition, in this embodiment, the domain admission control request is usually received from a session controller in the routing domain, so the DBM 116 further communicates (412) a domain admission control response to the session controller indicating whether admission to the routing domain is granted for the communication session.

FIG. 5 illustrates a signaling flow for implementing methods 300 and 400 within routing domain 100 for example. This embodiment is described by reference to laptop 101 (a source device that is connected to OSPF Area 1) attempting to establish a communication session with PDA 105 (a destination device that is connected to OSPF Area 4). To initiate the communication session, laptop 101, which also includes SIP software, sends a call request packet (e.g., a SIP Session Initiation Request) to a session controller (e.g., SC 520) configured for functioning as described above to manage calls (e.g., setup, transfer and termination) within domain 100. Responsive to the Session Initiation Request, the SC 520 communicates with a DBM (e.g., 502) for determining whether admission can be granted to domain 100 for the communication session. DBM 502 is configured in accordance with apparatus 200 as described above, wherein only a AC 504 and a TM 506 are shown for ease of illustration.

Returning to the signaling flow illustrated in FIG. 5, more specifically in a step (1) that corresponds to step 302 of FIG. 3, AC 504 receives a domain admission control request from the SC 520 via the SC-AC interface 218. The domain admission control request comprises a resource reservation request that specifies a source router, e.g., router 154, a destination router, e.g., router 177 (that are each identified by an IP address), and an amount of requested bandwidth. The resource reservation request may be communicated using an implementation-specific message exchange protocol.

AC 504 interfaces with TM 506 via the AC-TM interface 236 and receives (in a step (2) corresponding to step 304 of FIG. 3) an area-by-area path from the source router IP address to the destination router IP address that comprises a plurality of OSPF areas at the second level of domain 100 and at least one ABR (that is the inter-area link in this embodiment) connecting the plurality of OSPF areas. In one embodiment, the area-by-area path comprises an ordered list of OSPF areas. TM 506 calculates this area-by-area path in accordance with the OSPF protocol using the link and routing databases 234, 232, respectively, in a manner described above. In this illustration, the area-by-area path between source router 154 and destination router 177 comprises OSPF Areas 1, 2, 0 and 4 and ABRs A, C and D, e.g., as identified by their IP addresses. AC 504 determines or identifies the plurality of area bandwidth managers (e.g., ABM-1 through ABM-n) associated with the areas comprising the area-by-area path using the ABM database 214. In this illustration, ABM-1 through ABM-n comprises ABM1 (118), ABM2 (120) and ABM4 (124). AC 504 also identifies DBM 502 as being associated with OSPF Area 0, which is also included in the area-by-area path. AC 504 further identifies ingress (entry) and/or egress (exit) edge routers for OSPF Areas 1, 2 and 4.

In this embodiment each ABM is configured in accordance with the embodiment above as having a TM but no AC. At a step (3) corresponding to step 402 of FIG. 4, AC 504 communicates a topology request to the TM of ABM1, ABM2 and ABM4 via the DBM-ABM interface 220, and further communicates a topology request to TM 506 associated with OSPF Area 0 via the AC-TM interface 236. The topology request identifies at least the IP addresses associated with ingress and egress edge routers and requests topology information needed by AC 504 to make an edge-to-edge (e.g., source router to destination router) admission control decision for the communication session between the source and destination devices. In one efficient embodiment requiring less computations in the AC 504, the information requested may simply comprise summary information regarding available bandwidth for an intra-area path between the two identified routers. In other embodiments, additional and more specific summary intra-area path information may be requested such as the identities of one or more of the routers and links comprising the calculated intra-area path, along with the bandwidth information associated with the identified links. In yet another embodiment, that is least efficient due to its computational requirements especially for larger systems, full intra-area path information may be requested from the ABMs (and DBM in this case). In this illustration, AC 504 only requests available bandwidth information.

Accordingly, the topology request to the TM of ABM1 comprises the source (ingress) router 154 and an egress edge router ABR 130 and a request for available bandwidth information along an intra-area path (e.g., a shortest path) between the two routers. The topology request to the TM of ABM2 comprises an ingress edge router ABR 130 and an egress edge router ABR 134 and a request for available bandwidth information along an intra-area path between the two routers. The topology request to TM 506 comprises an ingress edge router ABR 134 and an egress edge router ABR 136 and a request for available bandwidth information along an intra-area path between the two routers. The topology request to the TM of ABM4 comprises an ingress edge router ABR 136 and destination (egress) router 177 and a request for available bandwidth information along an intra-area path between the two routers. Responsive to the topology requests, TM 506 and the TMs of ABM1, ABM2 and ABM4 determine their respective intra-area paths using the OSPF protocol and determine available bandwidth associated with the intra-area path. In a step (4) corresponding to step 404 of FIG. 4, TM 506 and the TMs of ABM1, ABM2 and ABM4 then each communicate a corresponding intra-area path communication to AC 504 via the same interface on which the topology request was received. The intra-area path communication is responsive to the topology request and comprises, in this case, summary intra-area path information that includes available bandwidth information associated with the computed intra-area path.

AC 504 determines the bandwidth information associated with each computed intra-area path from the received intra-area path communications and uses the collective bandwidth information to determine whether access for the communication session between laptop 101 and PDA 105 can be granted. AC 504 compares the amount of bandwidth requested to the available bandwidth associated with each computed intra-area path and determines that access for the communication session can be granted if the indicated available bandwidth received from each TM exceeds the amount of bandwidth requested, assuming no other policy consideration prohibits the communication session. However, where the indicated available bandwidth received from any one or more of the TMs does not support the amount of requested bandwidth, AC 504 can either determine that access cannot be granted for the communication session (and communicate this determination to SC 520) or request TM 506 to compute an alternate area-by-area path. Where an alternate area-by-area path is computed, AC 504 repeats the above described process for determining whether sufficient bandwidth exists to support the communication session. Where as in this illustration sufficient bandwidth exists to support the amount of bandwidth requested, AC 504 determines that access to domain 100 can be granted for the communication session between laptop 101 and PDA 105. AC 504 then determines a bandwidth change associated with the access determination, the bandwidth change usually being substantially the amount of requested bandwidth. AC 504 communicates the bandwidth change to TM 506 (via the AC-TM interface 236) and in a step (5) corresponding to step 410 of FIG. 4 to the TMs of ABM1, ABM2 and ABM4 (via the DBM-ABM interface 220) along with a request to reserve the bandwidth along the computer intra-area path. Actual resource reservation can be performed using any suitable protocol(s), e.g., RSVP, OSPF. Moreover, in a step (6) corresponding to step 412 of FIG. 4, which may in one embodiment be performed substantially concurrently with step (5), AC 504 communicates to SC 520 via SC-AC interface 218 that access can be granted to domain 100 for a communication session between laptop 101 and PDA 105.

It is not uncommon that links in an OSPF network suffer sudden changes. For example, a link or a router could go down due to a sudden power failure. The bandwidth management system in accordance with this embodiment is further configured to respond to such topology changes to maintain an efficient usage of the network resources. For example, a topology change could result in the blocking of a session being established over a computed path. In this embodiment of centralized admission control, the DBM always has the latest path information corresponding to the requested communication session, due to the active probing process from the DBM to the related ABMs during the admission control process. Thus as stated above, the access controller of the DBM can retry the process for determining whether access to the domain can be granted using an alternate area-by-area path if one is available. Moreover, since resources are not reserved until the DBM decides to admit the session, there is no need for a negative response message in the process of admitting a new session (except of course to the SC denying access to the domain), and no corresponding need for a recovery process.

A topology change could also affect an existing session, and the bandwidth management system in accordance with the embodiments herein is further configured for failure recovery during such a situation. As discussed in detail above, with the centralized admission control embodiment only the DBM includes an access controller for performing the required access control functionality. Therefore, whenever the TM of an ABM detects a topology change, the ABM itself cannot make a decision on how to deal with the affected sessions but sends a communication to the AC of the DBM indicating a change in the intra-area path used for the communication session so that the DBM can determine whether to retain admission to routing domain 100 based on the received communication.

Accordingly upon a topology change (e.g., a loss of a link, router, interface for a router, etc.), for each affected session the ABM TM may be configured to first attempt to initiate a local recovery by calculating an alternate intra-area path. If an alternate path is found, the communication to the DBM indicating a change comprises a local topology change request, together with at least bandwidth information associated with the alternate intra-area path for the AC to consider admission based on this new information and, perhaps, based on a predetermined admission control policy. However, if a local alternate path cannot be found, the communication to the DBM indicating a change may comprise a global topology change request for the AC of the DBM to consult the TM of the DBM to calculate an alternate area-by-area path for the communication path.

The AC can then determine a plurality of ABMs associated with the alternate area-by-area path and determine whether to retain admission control to the routing domain for the communication session. Accordingly, based on this alternate area-by-area hop path, the DBM queries each ABM involved for information on intra-area path segments between new ingress/egress edge router pairs to make a final admission control decision. Moreover, resource reservation state is updated along the old and new area-by-area paths that are maintained at the AC database.

In the remaining embodiments discussed, admission control is distributed among the DBM and ABMs and both the DBM and ABMs comprise apparatus 200 that includes an access controller and topology manager as described above. In general in accordance with these embodiments and as discussed in detail below by reference to FIGS. 6-11, the DBM communicates an area admission control request to at least one ABM for use in determining whether admission to routing domain 100 can be granted for a communication session. For example, FIGS. 6 and 7 illustrate an embodiment of distributed admission control using a hop-by-hop scheme, wherein the SC 520 sends the domain admission control request to AC 504 of DBM 502.

Figure 6:
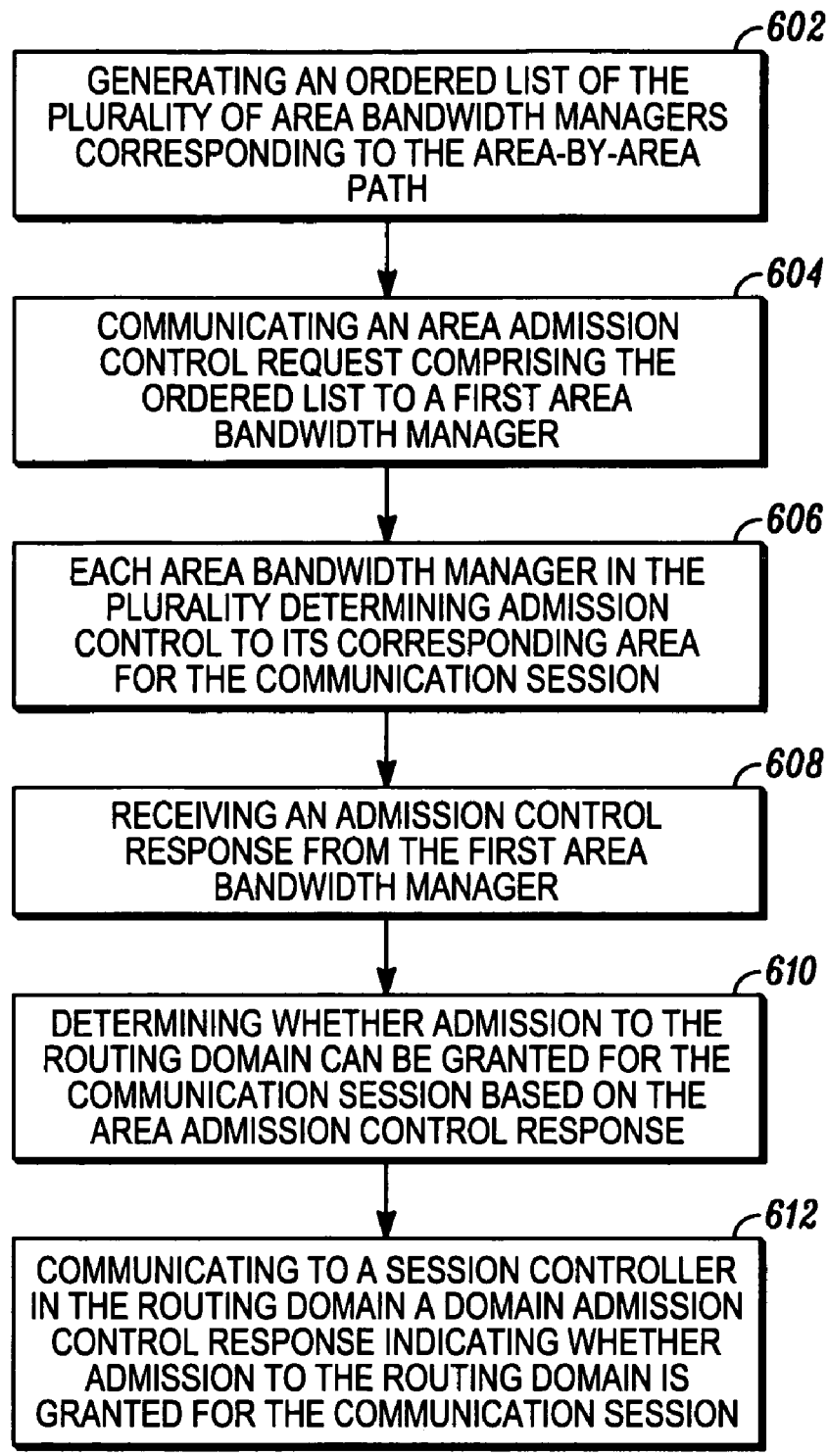
FIG. 6 illustrates a flow diagram of a method in accordance with an embodiment of the present invention.

More specifically, FIG. 6 illustrates a flow diagram of a method 600 comprising steps for facilitating the coordination of admission control (step 308 of FIG. 3). Method 600 comprises the steps of: generating (602) an ordered list of the plurality of area bandwidth managers corresponding to the computed area-by-area path; communicating (604) an area admission control request comprising the ordered list to a first area bandwidth manager for enabling admission control for each area in the area-by-area path to be determined (606) by the associated area bandwidth manager; receiving (608) an area admission control response from the first area bandwidth manager; determining (610) whether admission to the routing domain can be granted for the communication session based on the received area admission control response; and communicating (612) to the session controller a domain admission control response indicating whether admission to the routing domain is granted for the communication session.

Figure 7:
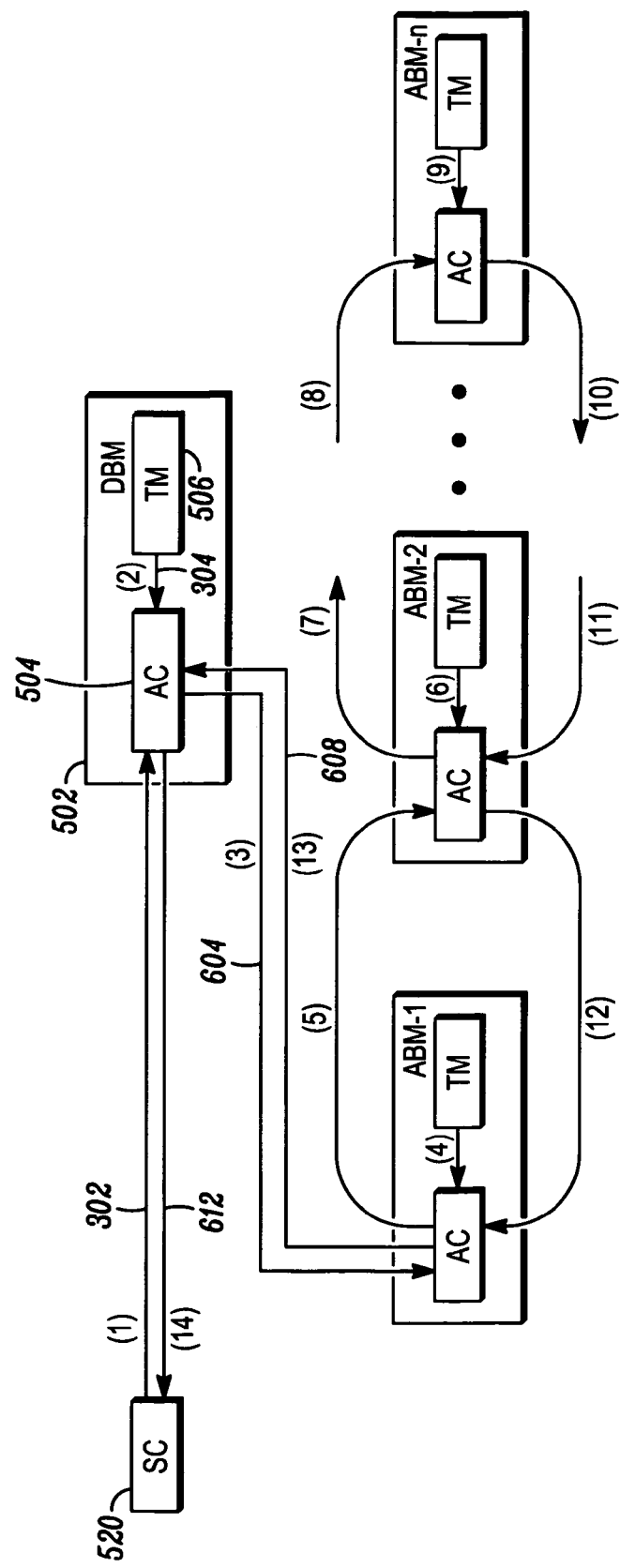
FIG. 7 illustrates distributed admission control in accordance with an embodiment of the present invention using a hop-by-hop scheme.

FIG. 7 illustrates a signaling flow for implementing methods 300 and 600 within routing domain 100. This embodiment is also described by reference to laptop 101 attempting to establish a communication session with PDA 105. Steps (1) and (2) are the same as steps (1) and (2) of FIG. 5 and will not be described again for the sake of brevity. Upon receiving the area-by-area path from TM 506, AC 504 identifies an ordered list of ABMs associated with the area-by-area path, also referred to herein as an ABM vector. The ABM vector in the case comprises ABM1, ABM2, DBM 502 and ABM 4. AC 504 at a step (3) corresponding to step 604 of FIG. 6 sends (via the DBM-ABM interface 220) an area admission control request that includes the ABM vector information, corresponding ingress and egress edge router IP addresses and, optionally, appropriate admission control policy information to the first-hop ABM (in this case ABM1) for it to start the inter-area bandwidth management process, wherein edge-to-edge admission control is administered on an area-by-area basis. Note that the DBM is included in the ABM vector since the hop path traverses OFPF Area 0.

The topology manager associated with each ABM in the ABM vector is responsible for determining an intra-area routing path from an ingress edge router to an egress edge router within the area, tracking available bandwidth along each edge-to-edge routing path in the area, and providing path information, including available bandwidth, upon request. Upon receiving an admission request for a session from a previous ABM or from the DBM, each ABM en route first checks if the path segment within its area can satisfy the bandwidth requirement of the session (e.g., steps (4), (6) and (9)). If so, the area admission control request is forwarded to the next-hop ABM (e.g., steps (5), (7) and (8), or otherwise, a failure recovery or a rejection process is initiated. If no bandwidth manager in the ABM vector rejects the request, the last bandwidth manager in the ABM vector (e.g., ABM4 in this case) will return a confirmation message in the reversed order (e.g., steps (10), (11) and (12). The AC of ABM1 at a step (13) corresponding to step 608 of FIG. 6 then sends an area admission control response to AC 504 (via the DBM-ABM interface 220) indicating that access can be granted to domain 100 for the communication session between the laptop 101 and the PDA 105. The AC 504 determines that access can be granted to domain 100 for the communication session between the laptop 101 and the PDA 105 and at a step (14) corresponding to step 612 of FIG. 6 then sends a domain admission control response to the SC 520 (via the SC-AC interface 218) so indicating.

The admission controller associated with each bandwidth manager is responsible for querying the topology manager of the bandwidth manager for appropriate intra-area topology information in order to administer admission control for a request to reserve bandwidth along an intra-area edge-to-edge path and determining feasibility of accepting the request based on topology information provided by the topology manager and the amount of bandwidth requested for reservation. The admission controller accepts the request if feasibility is ascertained and admission is justified by a predetermined admission policy. The request is otherwise rejected. Upon an area admission control request being rejected, the rejection can in one embodiment be propagated through previous ABMs in the ABM vector to the first ABM in the ABM vector to provide a response to the area admission control request that indicates that access to the domain for the communication session is rejected.

An advantage of the embodiment illustrated by reference to FIGS. 6 and 7 is that admission control policy distribution can be integrated into the resource reservation process, wherein policies can be bundled with the reservation request message when the DBM distributes the ABM vector.

Figure 8:
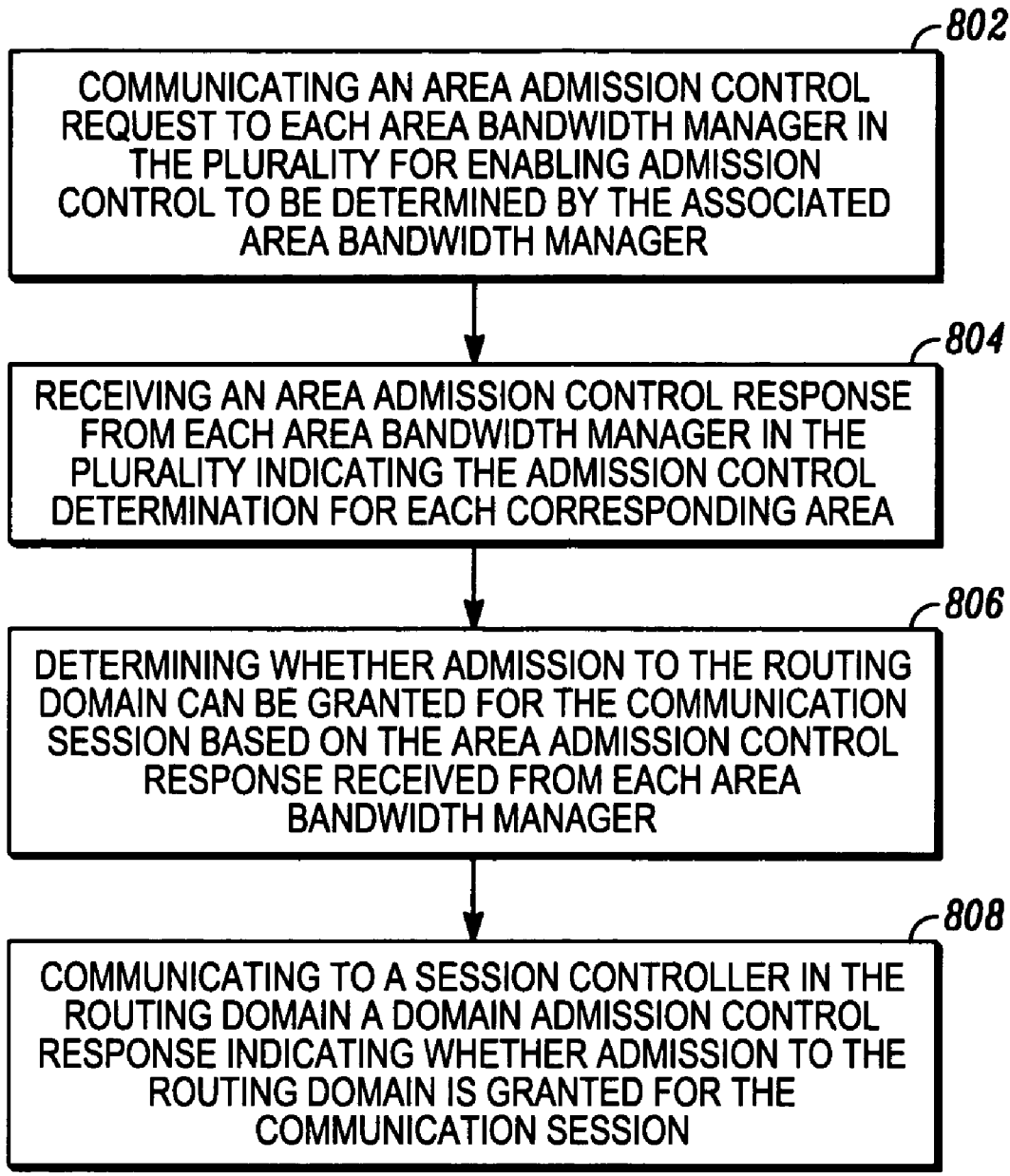
FIG. 8 illustrates a flow diagram of a method in accordance with an embodiment of the present invention.
Figure 9:
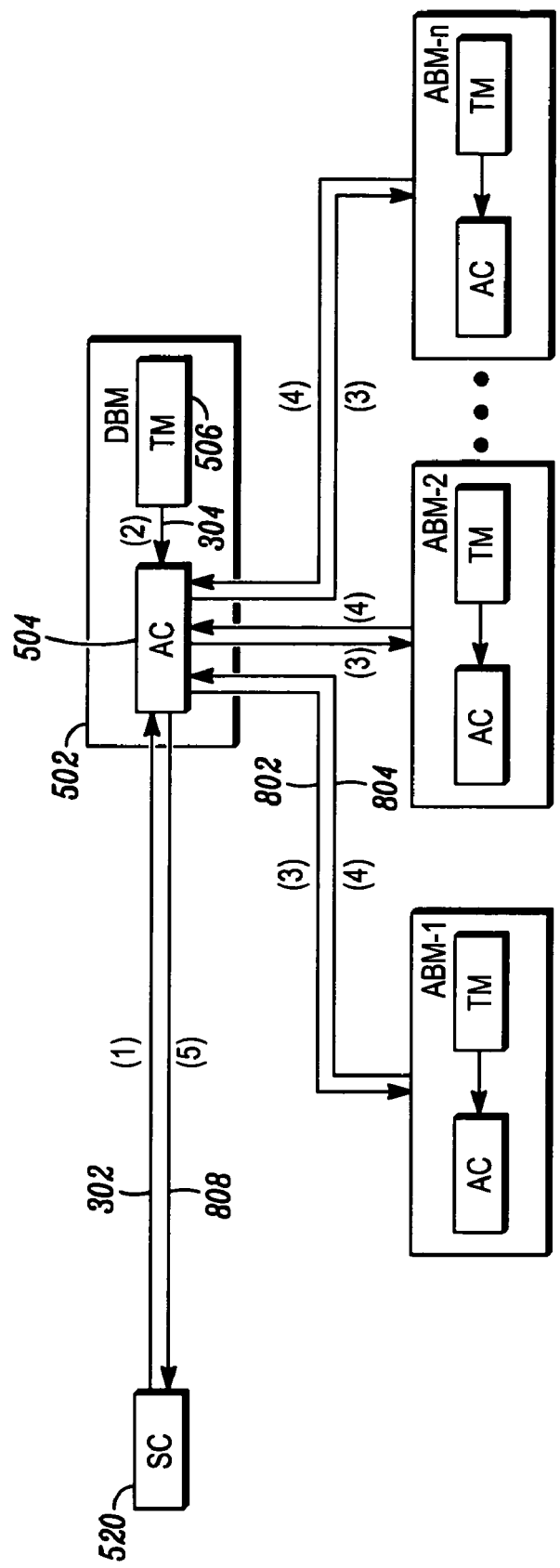
FIG. 9 illustrates distributed admission control in accordance with an embodiment of the present invention using a parallel scheme.

FIGS. 8 and 9 illustrate an embodiment of distributed admission control using a parallel scheme, wherein the SC 520 sends the domain admission control request to AC 504 of DBM 502. More specifically, FIG. 8 illustrates a flow diagram of a method 800 comprising steps for facilitating the coordination of admission control (step 308 of FIG. 3). Method 800 comprises the steps of: communicating (802) an area admission control request to each area bandwidth manager associated with the computed area-by-area path for enabling admission control to be determined for each corresponding area; receiving (804) an area admission control response from each area bandwidth manager in the plurality indicating the admission control determination for each corresponding area; determining (806) whether admission to the routing domain for the communication session can be granted based on the area admission control responses; and communicating (808) a domain admission control response to the session controller indicating whether admission control is granted for the communication session.

FIG. 9 illustrates a signaling flow for implementing methods 300 and 800 within routing domain 100. This embodiment is also described by reference to laptop 101 attempting to establish a communication session with PDA 105. Steps (1) and (2) are the same as steps (1) and (2) of FIG. 5 and will not be described again for the sake of brevity. Upon receiving the area-by-area path from TM 506, AC 504 identifies the ABMs associated with the area-by-area path (in this case ABM1, ABM2, DBM and ABM4). AC 504 at a step (3) corresponding to step 802 of FIG. 8 sends (via the DBM-ABM interface 220) an area admission control request that includes the corresponding ingress and egress edge router IP addresses to each ABM associated with the area-by-area path and also sends an area admission control request to TM 506. The ABMs and DBM 502 determine area admission control for their respective areas as described above by reference to FIG. 7 and return an area admission control response in a step (4) corresponding to step 804 of FIG. 8 indicating its determination. AC 504 determines end-to-end admission control for the communication session between laptop 101 and PDA 105 based upon these responses and at a step (5) corresponding to step 808 of FIG. 8 notifies the SC 520 of its determination.

Figure 10:
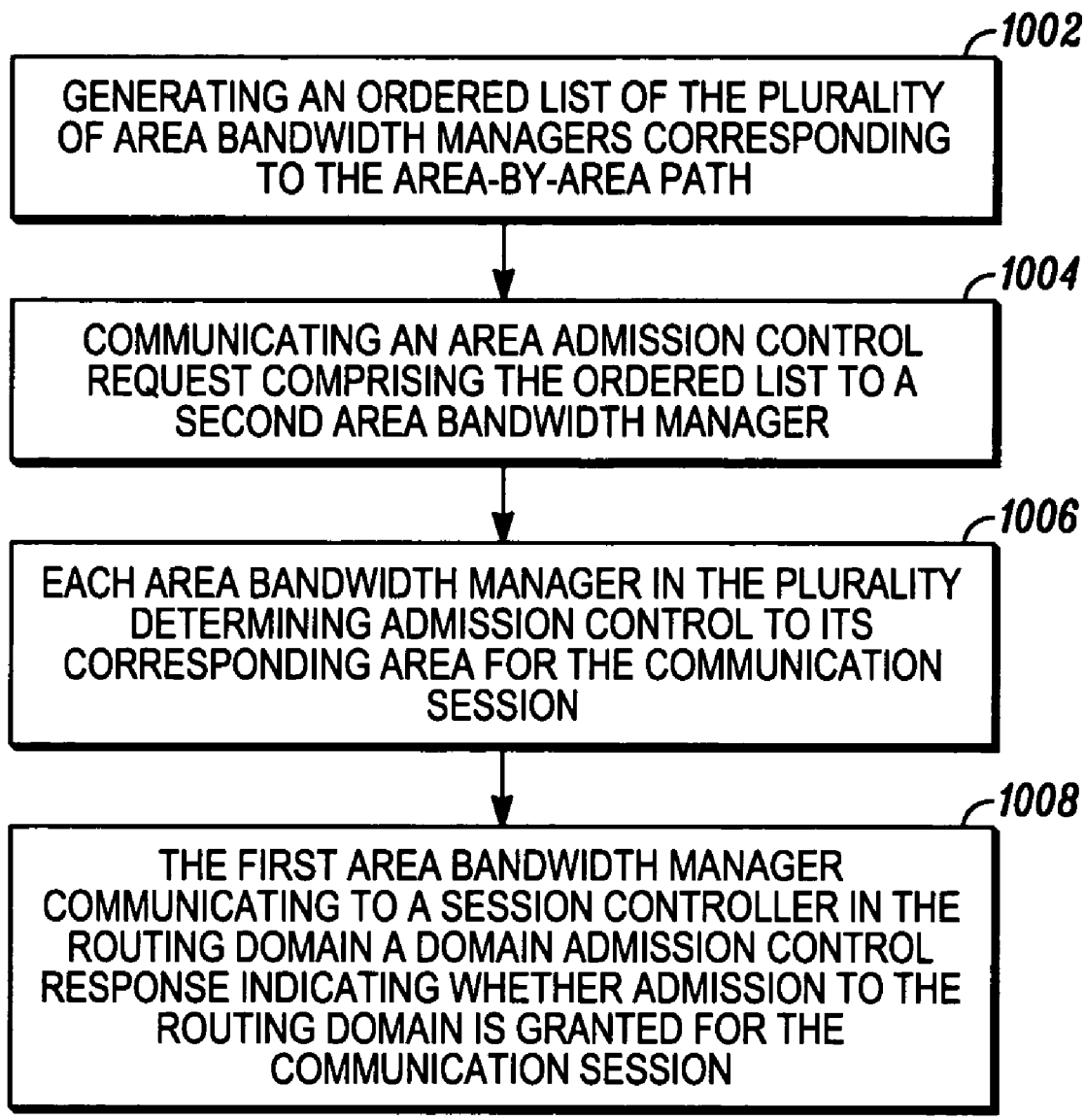
FIG. 10 illustrates a flow diagram of a method in accordance with an embodiment of the present invention.
Figure 11:
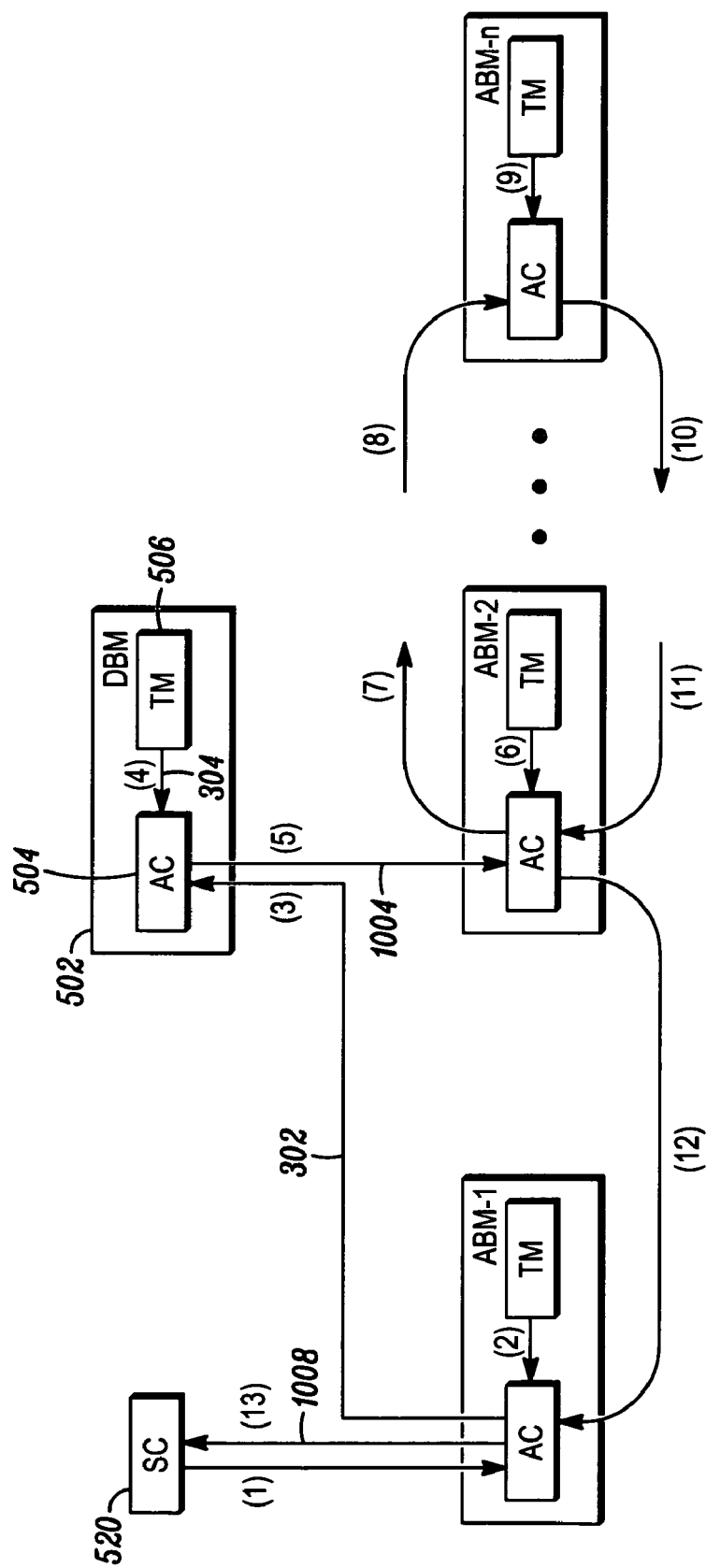
FIG. 11 illustrates distributed admission control in accordance with an embodiment of the present invention using a hop-by-hop scheme.

In yet another embodiment, FIGS. 10 and 11 illustrate distributed admission control using a hop-by-hop scheme that is similar to the embodiment illustrated by reference to FIGS. 6 and 7. However, in this embodiment the SC 520 sends the domain admission control request to a first hop ABM, which forwards the request if necessary to the DBM. In accordance with this embodiment, FIG. 10 illustrates a flow diagram of a method 1000 comprising steps for facilitating the coordination of admission control (step 308 of FIG. 3). Method 1000 comprises the steps of: generating (1002) an ordered list of the plurality of area bandwidth managers associated with the computed area-by-area path; and communicating (1004) an area admission control request to a second hop area bandwidth manager comprising the ordered list for enabling admission control for each area in the area-by-area path to be determined (1006) by the associated area bandwidth manager, wherein a domain admission control response is communicated (1008) from the first hop area bandwidth manager to the session controller indicating whether admission to the routing domain is granted for the communication session.

FIG. 11 illustrates a signaling flow for implementing methods 300 and 1000 within routing domain 100. This embodiment is also described by reference to laptop 101 attempting to establish a communication session with PDA 105. In accordance with this embodiment, the SC 520 can be further configured to learn the IP address of the first-hop ABM (in this case ABM1), for example, through ABM advertisements or communications similar to those received by the DBM from the ABMs. Thus in a step (1) SC 520 sends a domain admission control request as described above directly to the AC of ABM1 via a SC-AC interface 218.

Upon receiving the request, the ABM is ideally configured to first determine if the admission request is for an intra-area session, i.e., the source and the destination devices are within the same OSPF area. If so, ABM1 performs admission control based on the local topology and resource reservation information, provided by its local TM (at a step (2)), and returns the result to the SC 520. If the session goes beyond the local area, the request is forwarded to the DBM (step (3) corresponding to step 302 of FIG. 3), which will figure out the remaining ABM vector based on an area-by-area path computed by TM 506 and forwarded to AC 504 (step (4) corresponding to step 304 of FIG. 3). Note again that the DBM is itself part of the ABM vector in this case. An area admission control request as described above is then sent to the second-hop ABM2 (step (5) corresponding to step 1004 of FIG. 10), and a similar signaling process is performed as that illustrated and described above by reference to FIG. 7, wherein steps (6) through (12) of FIG. 11 correspond to steps (4) through (12) of FIG. 7. The difference between the signaling process of FIG. 7 and that of FIG. 11 being that the result of the area-by-area admission control process is reported to SC 520 at a step (13) corresponding to step 1008 of FIG. 10 instead of to the DBM.

An advantage of the embodiment illustrated by reference to FIGS. 10 and 11 is that intra-area sessions can immediately receive an admission control decision made by a local ABM, without consulting the DBM.

Figure 12:
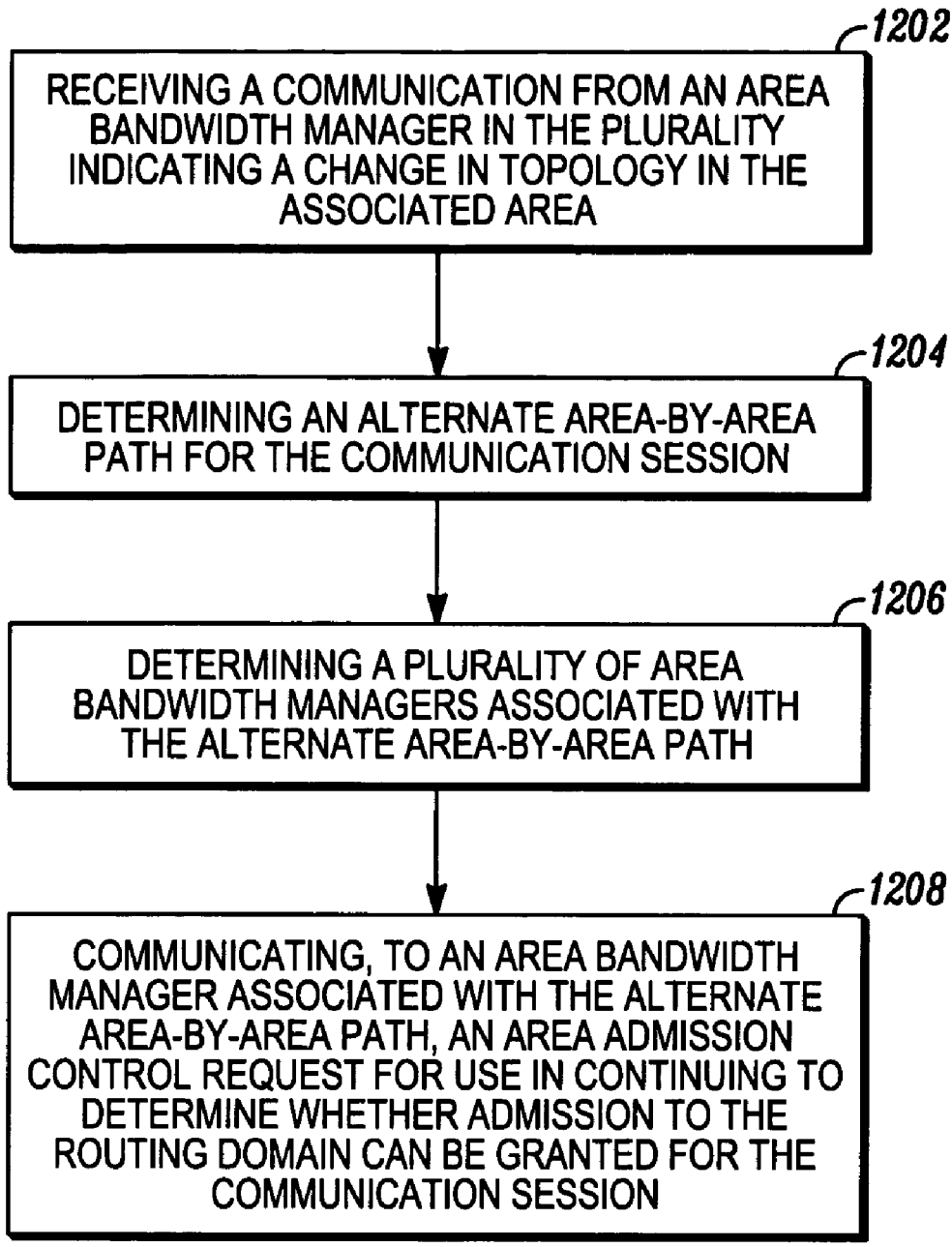
FIG. 12 illustrates a flow diagram of a method in accordance with an embodiment of the present invention.
Figure 13:
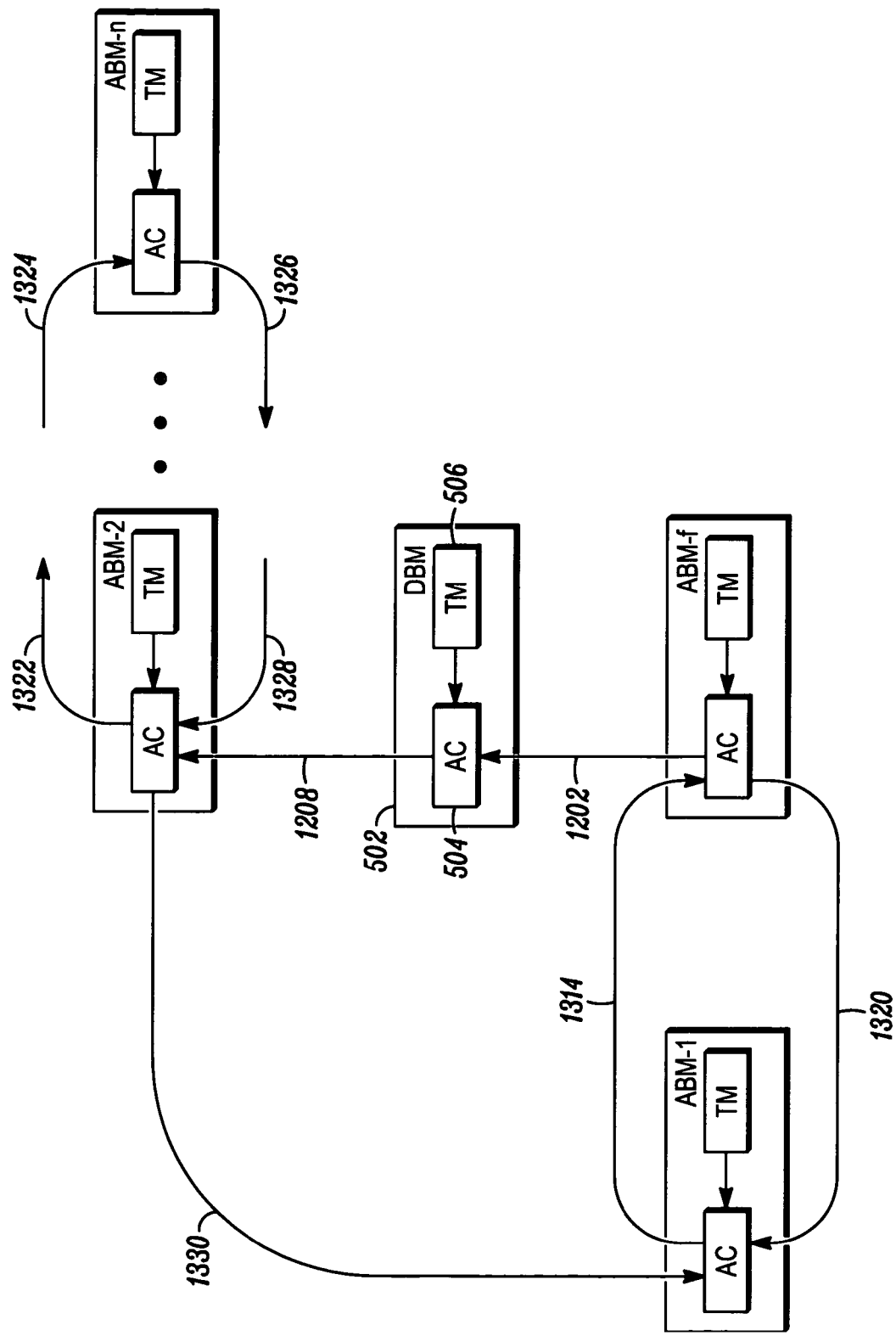
FIG. 13 illustrates a failure recovery method for the hop-by-hop schemes illustrated in FIGS. 7 and 11.

The distributed access control embodiments are likewise configured to address topology changes to maintain an efficient usage of the network resources. Since the signaling process of hop-by-hop or area-by-area admission control may be time consuming, having a failure recovery process may significantly enhance system response time. FIGS. 12 and 13 illustrate an embodiment of failure recovery for hop-by-hop or area-by area bandwidth management schemes during session initiation. The method 1200 of FIG. 12 is performed in DBM 502, upon receiving (1202) a communication from an ABM in the ABM vector indicating a change in the topology information associated with its area, and in general comprises the steps of: determining (1204) an alternate area-by-area path for the communication session; determining (1206) a plurality of area bandwidth managers associated with the alternate area-by-area path; and communicating (1208) to a selected area bandwidth manager associated with the alternate area-by-area path an area admission control request for use in continuing to determine whether admission control to the routing domain can be granted for the communication session.

FIG. 13 illustrates a signaling flow for the recovery process associated with method 1200. In accordance with this signaling process, an ABM en route (e.g., ABM-f which receives the area admission control request from ABM-1 in a step 1314) may reject a session request due to link failure, for instance. This could happen when there is inconsistency between the topology databases maintained at the ABM in the problematic routing area and those maintained at the DBM due to delayed link state update. Where admission control has failed or has been denied in any routing area associated with the ABM vector, the ABM (associated with the area having failed admission control) sends a notification to the DBM (in a step 1202), together with a new link state update of its area.

The DBM 502 can then either choose a cross-point ABM to continue the admission control process for the communication session, or authorize the ABM to send back a negative response (denying local admission) to the previous ABM in the ABM vector (in a step 1320), which is consequently forwarded to the SC and ultimately to the requesting device (e.g., laptop 101). A cross-point ABM refers to an ABM between the first-hop ABM and the ABM associated with the problematic routing area on the original area-by-area path, wherein an alternate area-by-area hop path used for recovery diverges from the original area-by-area hop path. Those of ordinary skill in the art will realize that a negative response message also serves as a resource release indicator, whereby, upon receiving a negative response, the amount of bandwidth corresponding to the failed session is released from the path segment in the area managed by the receiving ABM. In the example shown in FIG. 13, the DBM 502 computes an alternate area-by-area path, based on the latest topology update, and authorizes (in step 1208) the cross-point ABM, namely ABM-2, to continue the area-by-area admission control process using ABMs associated with the alternate area-by-area path (in steps 1322 through 1330).

A topology change could affect an existing session in the distributed access control embodiment. In this case, since each ABM has AC functionality failure recovery of an active session can be executed first within each area. The AC of each ABM involved first consults the corresponding TM to calculate an alternative intra-area path that has enough resources to accommodate the affected session. The failure recovery process ends successfully if such a path(s) can be found and no further action is required. Otherwise, the failure recovery process continues with the AC of the DBM attempting to compute an alternate area-by-area path based on the global topology information at area 0. If, in the end, no alternative path can be found, the corresponding resource is released from the entire area-by-area path. Otherwise, only the resource on the replaced portion is released. Moreover, when a communication session is terminated those reserved resources are likewise released.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A method for facilitating hierarchical bandwidth management in a hierarchical routing domain comprising a domain bandwidth manager and area bandwidth managers, the method comprising at an area bandwidth manager:
    detecting a topology change in a routing area affecting an intra-area path of a communication session;
    communicating to the domain bandwidth manager a topology change request indicating the topology change;
    receiving a response to the topology change request from the domain bandwidth manager; and
    updating link bandwidth usage information associated with the intra-area path based on the response to the topology change request,
    wherein communicating the topology change request comprises:
        for each communication session admitted in the routing area, computing an intra-area path between ingress and egress routers associated with the communication session within the routing area; and
        if an intra-area path is found determining available bandwidth information associated with the intra-area path based on bandwidth information associated with intra-area links forming the intra-area path and adding path information of the intra-area path and the associated bandwidth information to the topology change request; and
        if an intra-area path cannot be found indicating in the topology change request that the intra-area path cannot be found.

2. The method of claim 1, further comprising
    receiving, from the domain bandwidth manager, a topology request for the communication session;
    determining, for the communication session, the intra-area path and available bandwidth information associated with intra-area path;
    communicating to the domain bandwidth manager a response to the topology request;
    receiving from the domain bandwidth manager an admission control decision regarding the communication session; and
    updating link bandwidth usage information associated with the intra-area path based on the admission control decision.

3. The method of claim 2, wherein determining the intra-area path comprises:
    receiving identifiers of an ingress router and an egress router from the domain bandwidth manager;
    collecting intra-area link state advertisements from routers within the routing area; and
    computing a path from the ingress router to the egress router based on path selection, the path comprising a concatenation of intra-area links that are links in the routing area.

4. The method of claim 1, wherein determining the available bandwidth information comprises determining the available bandwidth information associated with the intra-area path based on bandwidth information associated with a set of intra-area links in the routing area, the available bandwidth information representing a difference between a link capacity associated with each intra-area link and an amount of bandwidth allocated on the intra-area link for facilitating existing communication sessions.

5. The method of claim 4, wherein the link capacity information associated with each intra-area link in the set of links is obtained by the area bandwidth manager through an interface with a network management protocol.

6. The method of claim 4, wherein the amount of bandwidth allocated is determined by the area bandwidth manager based on the communication of admission control decisions by the domain bandwidth manager.

7. The method of claim 1, wherein the response comprises at least one of summary intra-area path information that includes available bandwidth information associated with the intra-area path for facilitating the communication session in the routing area or identities of at least one of routers or links associated with the intra-area path, as well as available bandwidth information associated with the identified links.

8. A method for facilitating hierarchical bandwidth management in a hierarchical routing domain comprising a domain bandwidth manager and area bandwidth managers, the method comprising at the domain bandwidth manager:
    receiving a topology change request from one of the area bandwidth managers in an associated routing area of a communication session, the topology change request indicating a topology change affecting an existing intra-area path in the routing area; and
    deciding whether to retain admission for the communication session based on information received in the topology change request, an admission control policy, and optionally information received via a subsequent topology recovery process;
    wherein the decision comprises:
        determining whether the admission should be retained based on the admission control policy if an alternate intra-area path has been found, and
        if the alternate intra-area path has not been found, calculating an alternate area-by-area path for the communication path, determining the area bandwidth managers associated with the alternate area-by-area path, and determining whether to retain admission control using the alternate area-by-area path.

9. The method of claim 8 further comprising:
    receiving a domain admission control request for initiating the communication session;
    determining routing areas for the communication session;
    communicating a topology request to each area bandwidth manager associated with the routing areas;
    receiving a response to the topology request from the area bandwidth managers;

determining whether the communication session is admissible based on the response; and communicating to the area bandwidth managers an initial admission control decision regarding the communication session.

10. A method for facilitating hierarchical bandwidth management, comprising:

at a domain bandwidth manager associated with an upper level of a hierarchical routing domain containing a plurality of routing areas:

fulfilling an admission control request for a communication session with each of a plurality of area bandwidth managers to provide a communication path, each area bandwidth manager associated with at least at one of the routing areas;

receiving a topology change request from one of the area bandwidth managers, the topology change request indicating a topology change affecting an existing intra-area path in the one of routing areas and that an alternate intra-area path cannot be found in the one of routing areas;

calculating an alternate area-by-area communication path that also fulfills the admission control request;

determining whether admission to the communication session should be retained based on a predetermined admission control policy; and communicating to each of the area bandwidth managers an admission control decision regarding the communication session.

11. The method of claim 10 wherein fulfilling the admission control request comprises:

communicating a topology request to each area of the bandwidth managers;

receiving a response to the topology request from at least one of the area bandwidth managers;

determining whether the communication session is admissible based on the response; and communicating to each of the area bandwidth managers an initial admission control decision regarding the communication session based on whether the communication session is admissible.

12. The method of claim 11, wherein the topology request comprises identifiers of an ingress router and an egress router through which an area-by-area path determined based on path selection in accordance with a predetermined link state routing protocol respectively enters and exits the associated routing area.

13. The method of claim 11, wherein the response comprises summary intra-area path information that includes available bandwidth information associated with an intra-area path in the associated routing area.

14. The method of claim 11, wherein determining admissibility of the communication session comprises:

determining that the communication session is not admissible to the hierarchical routing domain if the response indicates that available bandwidth on an intra-area path is less than an amount of bandwidth transmitted with the topology request; and determining that the communication is otherwise admissible provided no policy consideration prohibits the communication session, the policy consideration including preemption.

15. The method of claim 10, wherein the calculation occurs in response to receiving the topology change request, the alternate area-by-area communication path avoids the use of the one of the routing areas, the determination occurs after the alternate communication path has been calculated and the admission control decision is dependent on the determination based on the admission control policy.

16. The method of claim 10 further comprising:

determining the area bandwidth managers associated with the alternate area-by-area communication path, and determining whether to retain admission control to the routing domain for the communication session using the alternate area-by-area communication path.

17. The method of claim 10, wherein the topology change request comprises an identifier of the communication session and if an alternate intra-area path cannot be found, an indication thereof or if an alternate intra-area path has been found, an indication thereof and bandwidth information associated with the alternate intra-area path.

18. The method of claim 10, further comprising determining an area-by-area path, from a source device to a destination device, associated with the communication session to determine the routing areas.

19. The method of claim 18, wherein determining the area-by-area path comprises:

determining identifiers of the source and destination devices;

collecting inter-area link state advertisements from area border routers within the hierarchical routing domain; and computing a path from the source device to the destination device based on path selection in accordance with a predetermined link state routing protocol, the path comprising a concatenation of areas at the higher level of the hierarchical routing domain.

20. The method of claim 10 wherein the admission control determination comprises an indication that admission to the routing domain is denied for the communication session or an indication that admission to the routing domain is granted for the communication session and an amount of bandwidth change.

* * * * *

UNITED STATES PATENT AND TRADEMARK OFFICE
CERTIFICATE OF CORRECTION

PATENT NO. : 7,983,158 B2  Page 1 of 1
APPLICATION NO. : 11/291433
DATED : July 19, 2011
INVENTOR(S) : Guo et al.

It is certified that error appears in the above-identified patent and that said Letters Patent is hereby corrected as shown below:

On the Title Page, in the Figure, below Box "808", insert -- 800 --.

On the Title Page, in the Figure, below Box "1208", insert -- 1200 --.

In the Drawings:

In Fig. 1, Sheet 1 of 13, delete " 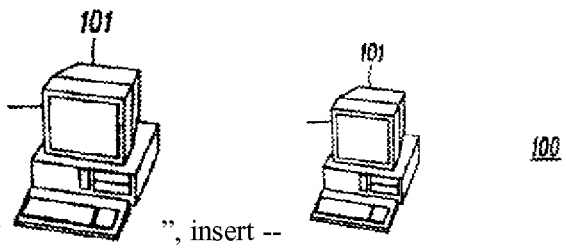 ", insert -- -- , therefor.

In Fig. 2, Sheet 2 of 13, below Box "230", insert -- 200 --.

In Fig. 3, Sheet 3 of 13, below Box "308", insert -- 300 --.

In Fig. 4, Sheet 4 of 13, below Box "412", insert -- 400 --.

In Fig. 6, Sheet 6 of 13, below Box "612", insert -- 600 --.

In Fig. 8, Sheet 8 of 13, below Box "808", insert -- 800 --.

In Fig. 10, Sheet 10 of 13, below Box "1008", insert -- 1000 --.

In Fig. 12, Sheet 12 of 13, below Box "1208", insert -- 1200 --.

Signed and Sealed this
Seventh Day of May, 2013

Teresa Stanek Rea
*Acting Director of the United States Patent and Trademark Office*